US008828516B2

(12) United States Patent
Durdag et al.

(10) Patent No.: US 8,828,516 B2
(45) Date of Patent: Sep. 9, 2014

(54) BIODEGRADABLE POLYMER NON-WOVEN ABSORBENT PAD WITH ABSORBENCY AND ANTIMICROBIAL CHEMISTRY

(75) Inventors: Kerem Durdag, Scarborough, ME (US);
Brian Pendleton, Newcastle, ME (US);
Robert Hamlyn, Newcastle, ME (US);
Valerie Gunn, Cape Neddick, ME (US);
Marc Etchells, West Hampton, MA (US)

(73) Assignee: Biovation II LLC, Boothbay, ME (US)

( * ) Notice: Subject to any disclaimer, the term of this patent is extended or adjusted under 35 U.S.C. 154(b) by 195 days.

(21) Appl. No.: 13/463,363

(22) Filed: May 3, 2012
(Under 37 CFR 1.47)

(65) Prior Publication Data

US 2013/0295315 A1 Nov. 7, 2013

(51) Int. Cl.
*B25B 27/04* (2006.01)
*D04H 13/00* (2006.01)
*D04H 1/74* (2006.01)

(52) U.S. Cl.
USPC ............. 428/76; 428/138; 442/123; 442/366; 442/381; 442/414

(58) Field of Classification Search
USPC ............. 428/76, 138; 442/414, 366, 123, 381
See application file for complete search history.

(56) References Cited

U.S. PATENT DOCUMENTS

| 5,444,113 | A | 8/1995 | Sinclair et al. | |
| 6,270,873 | B1 | 8/2001 | Darnett | |
| 6,808,791 | B2 * | 10/2004 | Curro et al. | 428/198 |
| 6,835,678 | B2 * | 12/2004 | Jackson et al. | 442/154 |
| 6,866,859 | B2 | 3/2005 | Pastecki et al. | |
| 7,135,135 | B2 | 11/2006 | Anderson | |
| 7,585,530 | B2 | 9/2009 | Etchells et al. | |
| 7,732,036 | B2 | 6/2010 | Etchells | |
| 7,799,361 | B2 | 9/2010 | Etchells et al. | |
| 2010/0285191 | A1 * | 11/2010 | Etchells et al. | 426/415 |

FOREIGN PATENT DOCUMENTS

EP 0937743 A1 8/1999

OTHER PUBLICATIONS

Simpson. Plastics Additives & Compounding. Sep./Oct. 2003. 3 pages.*
Church, et al., "Modified Atmosphere Packaging Technology: A Review", Journal Science Food Agriculture, 1995, vol. 67, pp. 143-152.
Wilson, "Intelligent and Active Packaging for Fruits and Vegetables", CRC Press, 2007 pp. 1-336.
Lopez-Rubio, et al., "Overview of Active Polymer-Based Packaging Technologies for Food Applications", Food Review International, vol. 20, No. 4, 2004 pp. 357-387.

(Continued)

*Primary Examiner* — Anthony Weier
(74) *Attorney, Agent, or Firm* — Dennis R. Haszko

(57) ABSTRACT

Included are food packaging materials and processes that are useful for commercial products to extend the freshness and preserve the integrity and shelf-life of packaged foods. Said food packaging materials utilize a low bioburden, biodegradable and/or compostable shock absorbing/cushioning non-woven structure and some form or forms of an antimicrobial and/or antifungal agent consisting of silver or silver-based species that destroy microbes which would otherwise spoil the food. The shelf-life extension process involves silver-based antimicrobial agents that function to mitigate the spread of food spoilage pathogens when they come in contact with the said food packaging materials. Fluid absorbing or superabsorbent, capabilities may be incorporated in the structure to control excess fluids.

25 Claims, 15 Drawing Sheets

Cross-sectional view of the food pad structure

(56) References Cited

OTHER PUBLICATIONS

Kenawy, et al., "The Chemistry and Applications of Antimicrobial Polymers: A State-of-the-Ad Review", Biomacromolecules, vol. 8, No. 5, 2007, pp. 1359-1384.

Martino, et al., "Processing and Mechanical Characterization of Plasticized Poly (lactide acid) Films for Food Packaging", Proceeding of the 8th Polymers for Advanced Technologies International Symposium, Budapest, Hungry, Sep. 13-16, 2005, pp. 1-3.

Martin, et al.,"Poly(lactic acid): plasticization and properties of biodegradable multiphase systems", Polymer, vol. 42, Issue 14, Jun. 2001, pp. 6209-6219.

Liu, et al., "Study of Effects of Processing Aids on Properties of Poly(lactic acid)/Soy Protein Blends", Journal of Polymers and the Environment, vol. 19, No. 1, 2011, pp. 239-247.

Jackanicz, et al., "Polylactic Acid as a Biodegradable Carrier for Contraceptive Steroids", Contraception, vol. 8, Issue 3, Sep. 1973, pp. 227-234.

Gao, et al., "Recent Advances in Antimicrobial Treatments of Textiles", Textile Research Journal, vol. 78., No. 60, 2008, pp. 60-72.

* cited by examiner

Schematic representation of a generic meltblown fiber manufacturing line

Cross-sectional view of the food pad structure

BIODEGRADABLE POLYMER NON-WOVEN ABSORBENT PAD WITH ABSORBENCY AND ANTIMICROBIAL CHEMISTRY

FIELD OF INVENTION

The invention relates to active food packaging whereby a low bioburden biodegradable and/or compostable absorbent nonwoven medium which does not support bacterial growth is employed in conjunction with at least one antimicrobial agent such as silver-based and/or silver ion-based active ingredients in the absorbent media or other packaging material. The food packaging material of the present invention functions to destroy microbes within the packaging environment and as they come into contact with the food packaging material thereby preserving food integrity while introducing mechanical protection to the food (e.g., fruit/produce) within the package by, e.g., reduction of bruising and physical damage. Active ingredients that are part of the food packaging of the present invention can function in the condensed phase and the biodegradable nonwoven pad incorporated in a package can function as a carrier and/or a release vehicle for one or more antimicrobial and/or antifungal chemicals or other actives.

BACKGROUND OF THE INVENTION

Active food packaging is a critically important area that provides the foundation for keeping packaged food fresh while reducing microbe load, inhibiting microbe growth and/or keeping the product substantially microbe-free so that the nutritional value of the food can be maintained and loss from spoilage minimized. Consequently, because of advances in food packaging technology, more people have access to fresh food. Food producers, packers and sellers can also provide a higher quality product while sustaining less economic loss due to product spoilage.

Active packaging, i.e., packaging that incorporates methods and/or compositions for the inhibition of microbial growth, covers many areas, but can be broadly defined in the art as the use of chemical or biochemical systems, including the use of antimicrobial and/or antifungal agents, that preserve the freshness and extend the shelf life of a food product by interacting with the food or the atmosphere surrounding the food either constantly or via controlled release. One prior art method of controlling the package atmosphere is the use of what is termed in the food packaging industry as Modified Atmosphere Packaging (MAP) where, generally, the relative concentrations of oxygen, carbon dioxide and nitrogen are adjusted relative to each other to preserve the integrity and freshness of the particular packaged item. A good review of Modified Atmosphere Packaging is provided in the art by Church and Parsons (Church, I. J. & Parsons, A. L.: (1995) *Modified Atmosphere Packaging Technology: A Review*, Journal Science Food Agriculture, 67, 143-152), as well as Beaudry (Beaudry, R., *MAP as a Basis for Active Packaging, in Intelligent and Active Packaging for Fruits and Vegetables*, C. L. Wilson, Ed. CRC Press, 2007. pp. 31-55).

The term "antimicrobial" with respect to food packaging is known in the art to include any composition and/or method to reduce or inhibit microbial growth (including bacteria and fungi) and, therefore, has wide breadth in the art. For example, as explained in López-Rubio (López-Rubio, A., et. al., (2004). *Overview of Active Polymer-Based Packing Technologies for Food Applications*. Food Rev. Int., 20(4): 357-87, p. 366), carbon dioxide often exerts a microbiological inhibitory effect in meats, cheeses and baked goods, but excess carbon dioxide may also adversely affect the taste or texture of the food product as well. Still, use of carbon dioxide is considered by those of skill in the art to be an antimicrobial agent. To the extent that there are gases like carbon dioxide, and others as detailed below, that provide an antimicrobial effect, we classify their use together in food packaging as a type of antimicrobial packaging. Exemplary representation of the current state of the food packaging art is provided below.

1. Description of Related Art—Food Packaging Pads

In food packaging, an absorbent pad can be used for a variety of reasons, but is typically used to protect food articles from damage and to absorb moisture or biofluids that would otherwise compromise the freshness, integrity and appearance of the packaged food. Typically, a superabsorbent polymer, or SAP, is employed in granular or fiber form along with a nonwoven pad comprised of spunbond or meltblown synthetic fibers or paper pulp fibers, to absorb fluid. The pad typically can employ a film-based top and bottom layer with perforations that allow the fluid to reach the nonwoven absorbent layer but protect the food product from stray fibers.

U.S. Pat. No. 6,270,873, assigned to Sealed Air Corporation, teaches a food pad that comprises a top sheet and a bottom sheet with an absorbent nonwoven layer in between. According to the disclosure, the absorbent layer can be situated in the construction in a variety of ways. The top layer and bottom layer are sealed to confine the absorbent layer and microperforations are used in the various layers to allow fluid to permeate the sheet layers and reach the absorbent. However, such multilayer construction can be expensive and microperforations may become plugged by particulates. The patent does not have any teaching on biodegradable thermoplastic polymers and nor on the actual specific manufacturing process with regard to the involvement of antimicrobial and antifungal agents.

U.S. Pat. No. 7,732,036, assigned to Paper-Pak Industries, describes a shaped absorbent pad system whereby the pad system is sealed ultrasonically such that it prevents the pad from bursting due to fluid absorption, specifically with the usage of side panels and hinge connects. It also provides for multiple layers and also, among other features, allows that no perforations be used for fluid to flow into the absorbent pad. It also provides examples of using active agents to preserve packaged food freshness. However, this pad design is also relatively costly to manufacture and the envisioned active ingredients may not be optimal for longer term food preservation. Further, the pad design is not biodegradable and does not provide controlled release of an antimicrobial agent. And, finally, the pad system does not utilize biodegradable thermoplastic non-woven fibers that are specifically oriented and constructed to allow fluid absorption in manner that allows the adequate expansion of the pad.

U.S. Pat. No. 5,444,113, assigned to Ecopol, LLC, discloses products made of degradable materials that include a hydrolytically degradable polymer. Poly(lactic) acid is specifically mentioned, which is also called polylactide, which the authors further cite as a polydioxanedione. The authors list numerous forms of the biodegradable polymers such as laminates, foams, powders and adhesives, and they list ways to modify the polymers to enhance biodegradability. They specifically state that the materials in their invention degrade in a time period of a few months to a few years. However, they do not teach how antimicrobials may be incorporated into the degradable polymers of their disclosure nor how controlled release of the antimicrobial agent may be achieved. Further, they do not disclose how specific meltblown non-woven layer materials with enhanced mechanical and performance properties can be constructed and manufactured.

2. Description of Related Art—Antimicrobial, Biocidal, Antifungal Food Packaging Aspects U.S. Pat. No. 7,585,530, assigned to Paper-Pak Industries, discloses a multiphase food pad absorbent system that absorbs fluids and inhibits bacterial growth by incorporating bacteriostatic and/or bactericidal ingredients and, optionally, the ability to modify the atmosphere inside the package, with other options that include reaction promoters in the food pad to maintain the integrity and safety of the packaged article. It is also important to note that in U.S. Pat. No. 7,585,530, no mention of biodegradability is made. U.S. Pat. No. 7,585,530 focuses on absorbency and the use of superabsorbent materials specifically in related to meat products within the context of using an organic acid bacterial inhibitor. U.S. Pat. No. 7,585,530 also discloses atmosphere modification within the package by $CO_2/O_2$ modification, and discloses the use of enzymes to modify the atmosphere, specifically to reduce the oxygen content. Although this prior art claims antimicrobial materials in an absorbent medium, along with methods to modify the atmosphere inside the package, the art does not teach methods of controlled release of the antimicrobial agent(s) that would prolong the shelf life of the packaged food products.

U.S. Pat. No. 7,799,361, assigned to Paper-Pak Industries, similarly to U.S. Pat. No. 7,585,530, demonstrates an absorbent food pad constructed from tissue layers and is specifically related to absorbing liquid purge emanating from meat and poultry produce and using bacterial inhibitors to inhibit the growth of bacteria in the liquid purge itself. Also disclosed is a carbon dioxide generating system. There is no mention of the usage of antimicrobial agents in a controlled release manner and no discussion of a food pad that is biodegradable and no teaching of all aspects of the food pad non-woven construction including the calendaring of a non-woven biodegradable thermoplastic polymer.

SUMMARY OF THE INVENTION

The examples of the prior art provided above encompass packaging for both meat and produce. The advances in food packaging provided by the present invention, as detailed below, can apply to packaging for meat and produce and other foods, including, but not limited to, juices and liquids, amorphous solids and semi-solids, cheeses, seafood, and so on.

This invention utilizes, but is not limited to, antimicrobial action generated in situ upon contact of the pathogen with the antimicrobial agent, as opposed to conventional modified atmosphere packaging where the gaseous environment surrounding the packaged food product is altered during the packaging process, and changes due to respiration of the food product or other reactive chemistry. The in situ, contact-based action of the present invention can be controlled via reaction chemistry or a triggering event, such as contact with moisture, or it can be constantly released thereby providing antimicrobial and/or antifungal protection throughout the packaging life cycle. It is contemplated that the antimicrobial agent(s) is specifically integrated to the thermoplastic fibers and released when moisture (liquid or gaseous), humidity or free water content in the food package makes contact with the pad and pad fibers and/or during the biodegradation of the fibers.

The scope of this invention encompasses those aspects of food packaging that destroy or prevent microbial growth in and on a packaged product by the use of an antimicrobial agent. The antimicrobial agents of the present invention can function in the condensed phase, where condensed phase means a liquid or solid, or in a gaseous phase and said antimicrobial agents can be generated in situ via a chemical reaction, or used as-is, or released in a controlled fashion.

The invention also includes, but is not limited to, the antimicrobial chemistries described herein used in conjunction with biodegradable nonwoven fibers and non-biodegradable nonwoven fibers, the fibers having antimicrobial activity and/or very low bioburden. Such biodegradable and low bioburden fibers include those based on poly(lactic) acid, also known as polylactide, and its various L, D and meso configurations, including mixed L, D, and meso compositions, their various crystallinities, molecular weights, and various copolymers. In this work poly(lactic) acid it is understood to be synonymous with poly(lactide) and both terms encompass all the optically active variations of the polymer. Other examples of antimicrobial, low bioburden polymers are known to those in the art as shown in a review by Kenway, et. al., (Kenway, E. R., Worley, S. D., Broughton, R. (2007), The chemistry and applications of antimicrobial polymers. A state-of-the-art review; Biomacromolecules, 8 vol, number 5 1359-1384).

The current invention advances the art of food packaging and active food packaging on two fronts. In an embodiment, the invention contemplates absorbent media which is specifically integrated to a biodegradable thermoplastic polymer non-woven layer concurrently with the creation of a unique apertured biodegradable thermoplastic polymer film. The nature, construction and advantages of said absorbent media, together with the biodegradable thermoplastic polymer, are unique and non-obvious. Second, the absorbent media is combined with silver and/or silver-based antimicrobial and/or antifungal chemistry in a specific fashion that allows for a long-lasting, robust and cost-effective antimicrobial action. Preferred embodiments of the antimicrobial and/or antifungal chemistry are novel in their own right, but the major advance is demonstrated in the concomitant use of both concepts: novel and non-obvious absorbent media architecture utilizing the biodegradable polymer with a surface to the food pad being apertured (i.e., porous or having porosity or having perforations or "pinpricks") and/or non-apertured (i.e., non-porous or essentially non-porous, not having perforations or "pin pricks"; allowing no more than a trivial amount of liquid and or gas to pass though the film) in combination with the novel and non-obvious silver and/or silver-based antimicrobial and/or antifungal chemistry. The apertures of the present invention can be created through the calendaring process or created by other means known to those of skill in the art at the time of the invention. Even without apertures, the film may still have limited porosity much as fabric may allow limited amounts of liquid or gas to traverse the material.

Both aspects of this invention, the absorbent media and details of food preservation via controlled release silver and/or silver ion-based antimicrobial and/or antifungal chemistry should be understood in order to clearly delineate the advancement of the art.

A preferred antimicrobial agent is ionic silver, being released from a nonwoven pad made preferably from poly (lactic) acid fibers incorporating, in one aspect, absorbent media and superabsorbent media.

Examples of suitable silver and silver ion-based agents include, but are not limited to, silver halides, nitrates, nitrites, selenites, selenides, sulphites, sulphates, sulphadiazine, silver polysaccharides where such polysaccharides include simple sugars to polymeric and fibrous polysaccharides, silver zirconium complexes, forms including organic-silver complexes such as silver trapped in or by synthetic, natural or naturally-derived polymers, including cyclodextrins; all compounds, inorganic or organic, that contain silver as part of the structure, where such structures can exist as a gas, solid, or liquid, as intact salts, dissolved salts, dissociated species in protic or aprotic solvents and silver species which contain the molecular morphology or macroscopic properties of materials in contact with silver whereby such materials, either organic, inorganic, and/or of biological nature, are found in various morphologies, such as crystalline or amorphous forms, or optical activities, such as d, l or meso forms, or tacticities such as isotactic, atactic, or syndiotactic, or mixtures thereof of any of the above.

Silver ion-based agents include and are defined as, for example, compounds that contain silver as part of the structure that can be covalently bound, ionically bound, or bound by other mechanisms known as "charge-transfer" complexes, including clathrate compounds that involve silver or silver species as part of the structure. Silver ion-based agents also include silver or silver containing species that exist as a result of the process of sorption, either chemical or physical sorption, meaning absorption or adsorption, where the sorptive surface can be a molecule, polymer, organic or inorganic entity such as, but not limited to, synthetic oligomers or polymers (either thermoplastic or thermoforming), natural or naturally-derived polymers (either thermoplastic or thermoforming), biodegradable and non-biodegradable polymers (either thermoplastic or thermoforming), and inorganic or organic species whose surface area provides for some sorptive effect including, but not limited to, charcoal, zeolites of all chemical structures, silica, diatoms, and other high-surface area materials, also including silver or silver species in all its known valence states, either organically or inorganically bound, and includes organic or inorganic materials, either gas, liquid, or solid, where the silver or silver species can "exchange" or transfer by mechanisms such as, but not limited to, ion-exchange, diffusion, replacement, dissolution, and the like, including silver glass, silver zeolite, silver-acrylic and nano-silver structures. Zeolite carrier based (the silver ions exchange with other positive ions (often sodium) from the moisture in the environment, effecting a release of silver "on demand" from the zeolite crystals) and glass based silver chemistries (soluble glass containing antimicrobial metal ions wherein with the presence of water or moisture, the glass will release the metal ions gradually to function as antimicrobial agents), are non-limiting examples of silver-ion-based agents suitable for use in the present invention.

Any combination of the above exemplary silver and silver ion-based agents is also contemplated for use in the food pads of the present invention.

In a preferred embodiment of the present invention, the antimicrobial and antifungal agents are incorporated into the actual fibers of the food pad. In this embodiment, the agents are added to the polymer prior to the formation of the polymer into fibers. In this embodiment, the agents are released as the fibers breakdown and thereby provide antimicrobial and antifungal affects to the package environment, including the food product, in which the food pad is placed. In this embodiment, the antimicrobial and antifungal agents are released, at least in great part, as the fibers in the non-woven pad degrade in the package environment. In another embodiment, the antimicrobial and antifungal agents are interspersed between the fibers of the food pad. In this embodiment, the agents are added to the fiber composition after the polymer is formed into fibers. In this embodiment, the antimicrobial and antifungal agents are released, at least in part, as the fibers in the non-woven pad degrade in the package environment. In yet another embodiment the antimicrobial and antifungal agents are both incorporated into the actual fibers and interspersed between the fibers.

In other embodiments, non-silver and non-silver ion-based antimicrobial and antifungal agents are contemplated for use with the food pads of the present invention. These non-silver and non-silver ion-based agents may be used in conjunction with the silver and silver ion-based agents of the present invention. One of ordinary skill in the art, based on the teachings of the present specification, can determine suitable combinations of agents depending on the fiber composition of the food pad, the size of the food package, the type of food being packaged, etc. Suitable non-silver and non-silver ion-based agents are, but are not limited to, compounds containing zinc, copper, titanium, magnesium, quaternary ammonium, silane (alkyltrialkoxysilanes) quaternary ammonium cadmium, mercury, biguanides, amines, glucoprotamine, chitosan, trichlocarban, triclosan (diphenyl ether (bis-phenyl) derivative known as either 2,4,4'-trichloro-2' hydroxy dipenyl ether or 5-chloro-2-(2,4-dichloro phenoxyl)phenol), aldehydes, halogens, isothiazones, peroxo compounds, n-halamines, cyclodextrines, nanoparticles of noble metals and metal oxides, chloroxynol, tributyltins, triphenyltins, fluconazole, nystatin, amphotericin B, chlorhexidine, alkylated polethylenimine, lactoferrin, tetracycline, gatifloxacin, sodium hypophosphite monohydrate, sodium hypochlorite, phenolic, glutaraldehyde, hypochlorite, ortho-phthalaldehyde, peracetic acid, chlorhexidine gluconate, hexachlorophene, alcohols, iodophores, acetic acid, citric acid, lactic acid, allyl isothiocyanate, alkylresorcinols, pyrimethanil, potassium sorbate, pectin, nisin, lauric arginate, cumin oil, oregano oil, pimento oil, tartaric acid, thyme oil, garlic oil (composed of sulfur compounds such as allicin, diallyl disulfide and dyallyl trisulfide), grapefruit seed extract, ascorbic acid, sorbic acid, calcium compounds, phytoalexins, methylparaben, sodium benzoate, linalool, methyl chavicol, lysozyme, ethylenediamine tetracetic acid, pediocin, sodium lactate, phytic acid, benzoic anhydride, carvacrol, eugenol, geraniol, terpineol, thymol, imazalil, lauric acid, palmitoleic acid, phenolic compounds, propionic acid, sorbic acid anhydride, propylparaben, sorbic acid harpin-protein, ipradion, 1-methylcyclopropene, polygalacturonase, benzoic acid, hexanal, 1-hexanol, 2-hexen-1-ol, 6-nonenal, 3-nonen-2-one, methyl salicylate, sodium bicarbonate and potassium dioxide.

Thus, in an embodiment of the present invention, the invention comprises an absorbent, biodegradable food pad, comprising: at least one layer (i.e., a core) of non-woven fibers comprising one or more biodegradable thermoplastic polymers and one or more silver-based or silver ion-based antimicrobial agents. The silver-based or silver ion-based antimicrobial agents can be are incorporated into the non-woven fibers or interspersed between the non-woven fibers. The fibers of the food pad are, in an embodiment, oriented to provide compression resistance and maintain paths for liquid-flow and air-flow, preferentially in a direction transverse or essentially traverse to an exterior surface. See, for example, FIG. 11. Further, the fibers of the present invention may be vertically lapped or spirally wound. "Vertically lapped" is defined herein as meaning that the ends of one set of fibers overlap vertically with the ends of another set of fibers, i.e., the fibers of the first set of fibers and the fibers of the second set of fibers are oriented substantially in the same direction and are overlapping to some degree. "Spirally wound" is defined herein as meaning that the fibers form substantially a helix.

In our current invention, although we can utilize synthetic fibers such as polypropylene and polyethylene, or paper such as recycled paper, we preferentially employ natural plant-based materials, such as natural polymers or naturally-derived meltblown nonwoven polymer fibers or filaments. One example is poly(lactic) acid (PLA), as defined above. The PLA is degradable and renewable, and has a low bioburden as opposed to, for example, recycled wood pulp. From an end-use standpoint and a processing and manufacturing standpoint, the low bioburden profile achieved with the nonwoven process precludes any heat drying that is required to destroy microbes present in a wood or tissue-based product; allowing a "cleaner" and safer system when compared to traditional alternatives such as wood pulp.

Another differentiating feature of PLA is that PLA is completely compostable, resorbable and safe in terms of cytotoxity, versus recycled pulp or synthetic fibers. One of the degradation products of poly(lactic) acid is lactic acid, which is produced in the human body.

Another feature differentiating the present invention from prior art technology is that most food pads are currently comprised of cellulose-based compositions as the absorbent medium, necessitating the use of a protective layer between the food and absorbent material. When a protective layer is needed to isolate the food from the pad a layer of thin PE film is generally used. This is glued onto the pad and a perimeter of film-to-film gluing is required to prevent edge leakage of fluid. Our selection of PLA (or other suitable thermoplastic fibers) eliminates the need for glue via the ability of thermoplastic materials ability to thermal bond and seal. This feature allows for more advantageous internal and perimeter bonding of the fibers compared to the current technique of pattern bonding or "stitching." Stitching is a process wherein the pulp fibers are mechanically forced via a calendar roll to weakly interlock. The present invention of thermal bonding the poly (lactic) acid fibers provides more mechanical strength. In many applications, a "four-side sealed" pad is preferred as this prevents the absorbent contents from escaping. Current practice requires the interior pad, or core, be smaller than the overall pad to allow the upper and lower film layers direct contact for sealing. With the biodegradable thermoplastic core structure of the present invention, the entire pad, outer film layers plus core, can be thermally bonded, thereby allowing a streamlined and lower cost manufacturing process and added design capabilities as the pad can easily be fabricated in complex shapes to fit a complex tray or containment device. Another advantage of poly(lactic) acid food pads of the present invention over the prior art is the ability of the food pad to be thermal bonded directly to package trays and incorporated into three-dimensional structures, whereas most pads today are glued to a tray.

In another feature differentiating the present invention from the prior art, as compared to the limited prior art wherein poly(lactic) acid is employed as a food pad, is that the PLA of the present invention can be specifically engineered to be fully degradable as well as function in a dual-use as a carrier or active component in an antimicrobial and/or antifungal release system.

Another feature differentiating the present invention from the prior art is that in the present invention the method of meltblowing the PLA fibers into continuous filaments is novel and non-obvious and imparts unique characteristics to the food pad of the present invention. The unique characteristics allow, for example, for the incorporation multiple layers of fibers and filaments that serve specific functions including, but not limited to, three-dimensional pads, or molded or formed pad systems using pattern forming techniques. The multiple layering is also useful to provide specific absorbency without the need to perform separate lamination operations, as is typically done in the prior art. Separate lamination operations encompasses a sequence of discrete process steps wherein sheets and webs are created on separate forming stations or machines and then utilizing a bonding system, the individuals webs are thermally or adhesively or ultrasonically fused together.

In one embodiment of the present invention, the fibers form a non-woven core that forms the absorbent portion of the food pad. The core may be covered with a surface film as described and exemplified in detail below. The core, the core in combination with the film and/or the film may be present in multiplicities (i.e., pluralities)—in other words, there may be one or more layers of core and surface film in any order or combination as is necessary for suitable fluid retention, for protection and antimicrobial/antifungal action for the food product being packaged. The surface film may comprise, but is not limited to, a biodegradable thermoplastic polymer hydrophobic film is comprised from one or more of polylactic acid, polylactide, polyglycolide, poly-L-lactide, poly-DL-lactide or copolymers thereof.

In another embodiment of the present invention, the fibers of the core of the food pad are oriented to provide compression resistance and maintain paths for liquid-flow and air-flow. In one embodiment, the fibers are oriented in a direction substantially traverse to the exterior surface. In other words, when formed in to a non-woven sheet, the fibers run substantially parallel to the surface of the sheet.

The food pad of the present invention is capable of expanding up to 5, up to 10, up to 15, up to 20 and up to about 25 times of the original thickness when liquid is absorbed by the food pad. The expansion can be without the rupturing of any surface film or the sealed edges of any surface film that envelopes or encases the non-woven core(s) of the food pad.

The food pad of the present invention is capable of holding up to 5, up to 10, up to 20, up to 30, up to 40, up to 50, up to 60, up to 70, up to 80, up to 90 and up to about 100 times of the original weight of the food pad when liquid is absorbed by the food pad. The expansion can be without the rupturing of any surface film or the sealed edges of any surface film that envelopes the non-woven core(s) of the food pad.

In another embodiment of the present invention, the PLA fibers of the present invention can be used in combination with other fibers such as spunbond polypropylene or polyethylene, but the fibers used with the PLA fibers of the present invention are not limited to those two materials. For example, the PLA fiber or fibers can be employed as an outer surface of a multi-layer construction to provide a barrier against the food. Additionally, hydrophilic or hydrophobic layers in a single layer or multilayer construction are possible where either the PLA or the other polymer, or both, are treated with materials to render the nonwoven filaments hydrophilic or hydrophobic, depending on the end use and purpose. The hydrophilic and hydrophobic materials can be introduced in the fiber prior to extrusion via masterbatching or via a subsequent process such as coating, spraying or dipping. The introduction of hydrophilic and hydrophobic materials to the fibers is not limited to the techniques mentioned here but can be accomplished by any technique available to those of ordinary skill in the art.

PLA polymer is suitable at the 100% level in this application, however, with the inclusion of additives such as co-polymers, masterbatch additives and/or plasticizers, other additional advantages are observed. The term "additives," as defined herein, are compounds that affect the manufacture and/or physical characteristic of the fibers and food pads of the present invention (i.e., also referred to as processing agents). As an example, when polycaprolactone, a degradable polymer often used in medical implants, is incorporated at up to 50% of the blend with PLA it imparts flexibility and softness to counteract the brittle nature of the PLA. Other additives function as plasticizers, lubricants and processing aids in the fiber spinning process. Examples of such methods and suitable agents are known to those of skill in the art as is shown by and outlined in, for example, "Processing and Mechanical characterization of plasticized Poly (lactide acid) films for food packaging V. P. Martino, R. A. Ruseckaite, A. Jiménez, *Proceeding of the 8th Polymers for Advanced Technologies International Symposium* Budapest, Hungary, 13-16 Sep. 2005", and "Poly(lactic acid): plasticization and properties of biodegradable multiphase systems *Polymer, Volume 42, Issue 14, June* 2001, *Pages* 6209-6219, O Martin, L Avérous", and "European Patent EP19990300874, assigned to KABUSHIKI KAISHA KOBE SEIKO SHO also known as Kobe Steel Ltd. (3-18, Wakinohama-cho 1 chome, Chuo-ku, Kobe, 651-0072, JP)" and "Study of Effects of Processing Aids on Properties of Poly(lactic acid)/Soy Protein Blends, Bo Liu, Long Jiang and Jinwen Zhang, Journal of Polymers and the Environment Volume 19, Number 1, 239-247."

Suitable examples of plasticizers, lubricants and processing aids are CP-L01 from Polyvel (Hammonton, N.J.) which is a PLA plasticizer specifically targeted to improving the toughness, impact and processing capabilities of PLA. Another product by Polyvel is CT-L01, a lubricant, which improves slip characteristics while retaining other properties; it decreases PLA's high coefficient of friction and therefore reduces or eliminates adhesion between other film or metal surfaces during production. Additionally, Polyvel CT-L03 is a processing aid which raises intrinsic viscosity of PLA providing increased molecular weight and improved melt strength. Many other similar products are present in the commercial polymer additive and modifier marketplace.

In our invention the PLA can be thermally glazed (also known as "calendaring"). This is a distinct advantage over conventional food pad materials. Heat with calendaring and even exposure to blasts of hot air can render the nonwoven filaments with a smooth film-like surface, yet still have porosity to fluids and moisture. With regard to the present invention, the calendaring process and the effect it has on the surface of the non-woven thermoplastic core of the food pad of the present invention may be considered to be a surface film. Porosity can be controlled by controlling the heat used to calendar the material, and by the usage of an engraving roll that can place apertures on the film. Glazing can be an overall surface treatment or a variable/zone application. For purposes of visual comparison only, and not for comparison to mechanical or end-use properties, the smooth glazed PLA fibrous surface resembles in looks only the commercial product Tyvek®. The purpose of the fiber glazing (calendaring) process is to eliminate the need for a separate film, and it provides a unique and advantageous method to control fluid flow in the food package with a minimum of lamination and processing effort while increasing the utility of the food pad. Non-limiting examples of the range of porosity that can be achieved by the calendaring process of the present invention are shown in Tables 3 and 4a, below. One of ordinary skill in the art would be able, with guidance from the teachings of the present invention, to extrapolate times and temperatures necessary for a desired porosity.

In a further embodiment of the present invention, food pads can be constructed eliminating the need for glues and adhesive bonding by utilizing the calendaring process and, at the same time provide, if warranted, perforations (apertures) that allow the biological food fluids to flow into the absorbent core. The current art, in reference to a food pad with an absorbent core, may have perforations in the protective layer that is in contact with food. Such layers are typically polyethylene, but they are not limited to polyethylene. The present invention also provides for a construction whereby a protective film, typically polyethylene or polypropylene, but not limited to those materials, and in present invention successfully done with polylactic acid (e.g., comprised from one or more of polylactic acid, polylactide, polyglycolide, poly-L-lactide, poly-DL-lactide or copolymers thereof), can be thermally bonded to the PLA absorbent core, if desired. The present invention utilizes thermal bonding which can bond similar and dissimilar materials including but not limited to film to film, film to fiber and fiber to fiber, generally employing thermoplastic materials including, but not limited to, thermoplastic materials of natural, naturally-derived or synthetic origin, both organic and inorganic in nature, as exemplified elsewhere in this specification.

In a further embodiment of the present invention, construction of the food absorbent pad can incorporate superabsorbent technology. The usage of the one or more superabsorbent agents allows the food pad to absorb the free fluid (e.g., water, biofluids, etc.) that is frequently present in food packaging (e.g., fresh produce packaging) to improve the visual appearance of the food to the consumer. Superabsorbents are generally insoluble crosslinked polyacrylamide polymers in granular form that absorb water and fluid, but the field of superabsorbent polymers is not limited to polyacrylamide chemistry, as is known by those of ordinary skill in the art. Superabsorbents, abbreviated SAP, provide an economical means to increase fluid-holding capacity. U.S. Pat. Nos. 7,732,036 and 7,799,361 (both of which are incorporated herein by reference in their entirety) teach the use of SAP technology in a food pad. Further, SAPs are available commercially. However, conventional use of SAP's do not preclude the escape of the particles from the absorbent food pad area into the food package thereby allowing the SAP to possibly come in contact with the food.

In a further embodiment of the present invention, the SAP particles are secured to either the nonwoven pad or the previously described films that contact the food surface (e.g., on the inner surface of the films facing the absorbent pad). First, for example, SAP's can be delivered to the fibrous web and to positioned between layers. They can be held in place mechanically by the fibrous web. Second, for example, any granular SAP's used in the present invention can be secured between two layers of the fibrous web and thermal calendared so as to create a compressed and mechanically bonded pad. Third, for example, any granular SAP's used in the present invention can be secured with an aqueous polyacrylic acid solution polymer and an appropriate crosslinker. Such a polyacrylic acid solution polymer is described in U.S. Pat. No. 7,135,135 (incorporated herein by reference in its entirety), assigned to H.B. Fuller Licensing and Financing, Inc., under the trade name FULATEX PD8081H. The crosslinking agent can be an aqueous zirconium reagent or any other appropriate crosslinker described in the patent or known in the art. U.S. Pat. No. 7,135,135 further describes a spray-able material that is superabsorbent. The present invention may employ the FULATEX PD8081H as a means to secure granular superabsorbent powder dispersed in the nonwoven absorbent web, where the nonwoven preferentially comprises totally or partially a fibrous poly(lactic) acid filament. The present invention does not preclude the use of FULATEX PD8081H on other natural, naturally-derived or synthetic nonwoven materials or with other granular materials, especially, but not limited to, various antimicrobial and/or antifungal agents. Further, with regard to the present invention, FULATEX PD8081H can in itself be and function as part of a multi-component active ingredient release system (i.e., a controlled release system such as that taught by the present invention).

In a further embodiment of the present invention, antibacterial agents can be added into the polymer that is then meltspun into fibers. In other words, the antimicrobial agents are incorporated into the polymer fibers of the present invention. This provides protection and encapsulation of the antimicrobial agents and provides controlled release of the agents as the polymers of the present invention degrade as they are designed. Antibacterial, antimicrobial and antifungal agents can also be incorporated into the food packaging materials of the present invention in a variety of ways.

In an embodiment of the present invention, the antimicrobial action is incorporated into the polymer fiber structure of the present invention. There is no antimicrobial action imparted on (e.g., applied to) the food packaging (i.e., the food wrapping, barrier layer or film, clamshell or other outer wrap, for example) or the food itself. The presence of the antimicrobial agent(s) in the non-woven material prevents the food pad discoloring due to speckling caused by, for example, of the presence of mold. It also prohibits the spread of pathogens on the food pad itself, which would nominally acquire moisture during use (and hence, a possible location for pathogen propagation) in, for example, the fresh produce food packaging.

One improvement of the present invention over the related prior art is that the present invention integrates the antimicrobial compound as a masterbatch directly into the thermoplastic (e.g., polylactic acid) fibers as part of the meltblown fiber manufacturing process with specifically tuned process variables (as exemplified below) which results in the non-woven material used in the food pad core. Additionally, an improvement of the present invention is to be able to specifically calendar (as a function of speed, pressure and temperature) the polylactic acid polymer non-woven material with the antimicrobial formulation in order to allow it to function as a food pad insert or food pad film.

One novel and unique improvement of the present invention over the related prior art is the construction of the pad from polylactic acid in a novel fashion that allows multiple layers of non-woven polylactic acid fibers to manufactured with multiple layers of superabsorbent captured in those layers without the use of adhesive, by utilizing the calendaring process directly in the meltblown processing line for the multiple layers. This allows for manufacturing flexibility and optimization while ensuring the robustness of the non-woven material layer(s) in order it to function as a food pad insert.

Another improvement of the present invention over the related prior art is the construction of the pad from the polylactic acid with the integrated superabsorbent polymer in a unique fashion using the calendaring of the PLA non-woven materials such that it allows the pad to absorb up to 50 grams of water per 3"×3" pad or up to approximately 7 gms per square inch (i.e., up to 100 times its dry weight) without rupturing and the PLA layers adequately stretching and keeping pad integrity intact. Thus, the food pad of the present invention has the unique property of absorbing and retaining high volumes of liquid thereby keeping the food product fresh. This novel advancement makes the functionality of the food pad to act as a food or fruit purge absorption pad possible.

DESCRIPTION OF THE FIGURES

FIG. 11 shows the pad insert orientation wherein the top surface is the horizontal surface on the photograph and the side of the insert is the vertical surface.

DETAILED DESCRIPTION OF THE INVENTION

Figure 1:
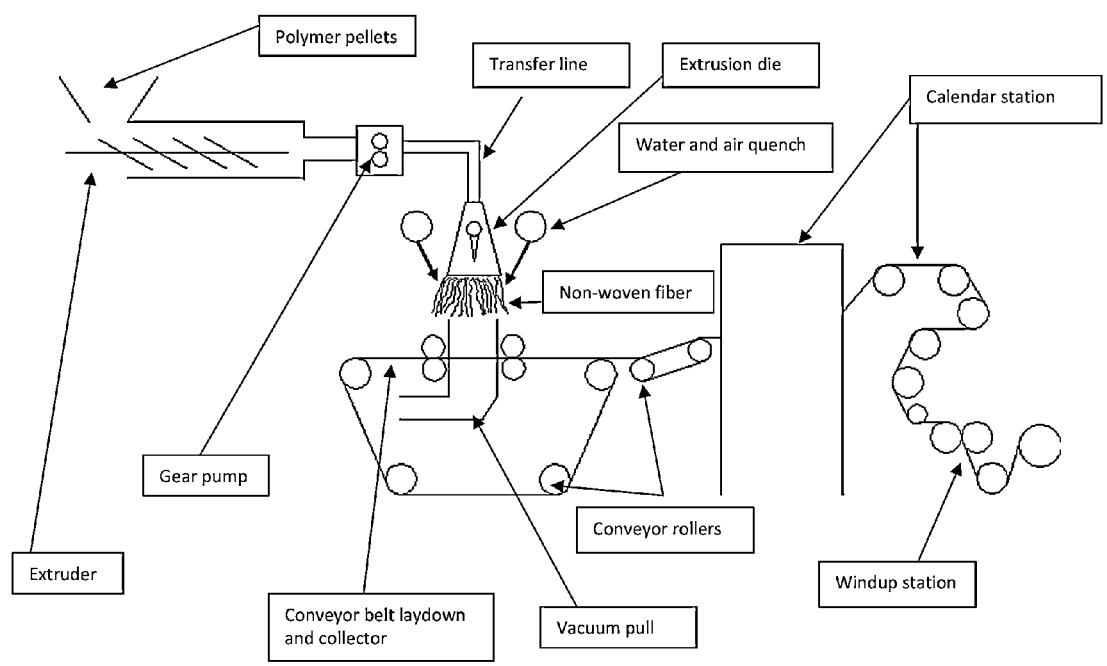
FIG. 1 shows a schematic diagram of an embodiment of the production method of the present invention.

As used herein, the term "polymer" refers to thermoplastic, natural, naturally-derived, synthetic, biopolymers and oligomeric species thereof. As used herein, the term "oligomer" refers to a low molecular weight polymer of two or more repeating monomeric repeating units. Polymers specifically include, but are not limited to, PolyLactic Acid (PLA); PolyCaproLactone (PCL) and PolyHydroxyAlkanoate (PHA) alone or in blends/alloys or as copolymers.

Wherein the disclosed methods are given, these are only exemplary and one of skill in the art will understand that, based on the teachings provided herein, modifications of these procedures are within the metes and bounds of the present invention.

NatureWorks (Minnetonka, Minn.) produces several grades of PLA in pellet form that can be melt processed into film or fibers and are useful in this invention. Many grades are useful however grade 6202D as a high melt-point version with the optional use of grade 6251D as a low-melt binder fiber have proven to process well in the present invention. Perstorp (Toledo, Ohio) produces PCL and, although several grades are suitable for use in the present invention, grade Capa 6800 processes well. Mirel PHA from Metabolix (Cambridge, Mass.) is also compatible with the present invention.

When processing PLA, to maintain maximum chain length, it is important to dry the polymer is a commercial desiccant dryer such as a Conair (Cranberry Township, Pa.) "W" series machine to a moisture level below 200 ppm. This is critical as PLA polymer is extremely hydroscopic and will acquire moisture from the air rapidly. This moisture hydrolytically degrades the polymer chains resulting in a reduced viscosity and thus product strength. If moisture levels are too high, the additional problem of steam generation and uncontrolled pressures within the extrusion system are observed.

For exemplification, for production, a Davis-Standard (Pawcatuck, Conn.) single screw 30:1 2.5" extruder (or equivalent) with melt temperatures of 350 to 425° F. and pressures of 500 to 2000 psi are achieved at the outlet. The polymer passes thru filtration to remove particulate debris and enters a pressure control zone achieved via a positive displacement Zenith (Monroe, N.C.) gear pump. Molten pressurized polymer is delivered to a melt-spinning die produced by BIAX (Greenville, Wis.). Several arrangements of nozzles, diameters, and total nozzle count can be varied to suit the polymer and final production needs. A typical spinning die contains 4000-8000 nozzles/meter of width with an internal diameter of 0.25-0.50 mm may be utilized efficiently. It must be noted that melt spinning dies produced by other suppliers such as Hills (W. Melbourne, Fla.) or Reifenhauser (Danvers, Mass.) may be used.

Heated and high velocity air is introduced into the die and both polymer and air streams are released in close proximity allowing the air to attenuate the polymer streams as they exit the die. Air temperatures of about 230-290° C. with pressures at the die at about 0.6 to about 4.0 atmospheres may be used. Following extrusion and attenuation, cool and/or moist air may be used to quench the fibers rapidly. At this point, liquids or mists can be applied to coat the surface. Surfactants, antimicrobials, fertilizers or adhesives can be beneficially adhered to the fibers.

The fibers may be collected on a single belt or drum or a multiple belt or drum collector. Air is drawn from below the belt(s) or drum(s) and fibers collect in a web or matt on the surface. There are many adjustments in the entire system, temperatures, pressures, quench conditions, extrusion air velocity, suction air velocity, etc. With these adjustment points, a matt that is, for example, stiff and thin or flexible and fluffy is possible. For this invention, a low-density structure with fine-diameter fibers is beneficial although one of skill in the art will realize that other densities and diameters are suitable for use in the present invention. The low density improves fluid acquisition and the small diameter maximizes surface area, which is important for the release of "actives" from the fibers.

Fiber diameters can range from approximately 1 to 30 microns ($\mu$m) however it is possible to produce nano or sub-micron fibers via increased hot air attenuation and/or low polymer throughputs. The cost of production increases as a result however the overall surface area of the fibers increases. Likewise, larger fibers are easily produced when attenuation air is reduced or eliminated and/or melt pressures are increased. A compromise of cost and performance is seen in, approximately, the 5-25 micron range. Within the large number of consecutive fibers being spun, it can be important to allow a range of diameters as this has been observed to increase the loft or thickness of the structure and this provides for improved shock absorbing and cushioning properties. Different diameters can be achieved by adjusting the internal nozzle diameters and/or air velocity at certain nozzles or by directing external cooling air toward certain fiber streams.

The invention described herein involves numerous embodiments around the production and use of biodegradable thermoplastic polymer fiber layers with super absorbent polymer (SAP) granules captured within the layers together with an antimicrobial, antifungal and biocidel agent in a food package that also provides for a natural or naturally-derived material, such as a nonwoven fibrous pad, where the agent is designed to prohibit, mitigate, prevent or inhibit microbe growth or kill microbes on the pad structure itself.

It is preferred to place "actives" in the polymer (as described and exemplified throughout the present specification) and, thus, in each fiber and/or interspersed between fibers. Traditionally, actives have been defined as chemical or physical agents that impart specific performance characteristics (as opposed to merely physical characteristics) to polymers. For example, it is current state of art to incorporate in to deodorant and cosmetic products actives using specialized pharmaceuticals and natural and botanical ingredients to provide odor control and wrinkle reduction for the user. For example, actives can be drug agents used for delivery of targeted therapeutics as outlined in "Polylactic acid as a biodegradable carrier for contraceptive steroids, Theodore M Jackanicz, Ph.D, et al., Contraception, Volume 8, Issue 3, September 1973, Pages 227-234." In our invention, actives are defined, at least in part, as antimicrobial ingredients which mitigate and control the propagation of pathogen in and on the polymer fibers and in the food package environment. A good overview of antimicrobial actives for textile application can be seen in "Recent Advances in Antimicrobial Treatments of Textiles, Yuan Gao and Robin Cranston, *Textile Research Journal* 2008; 78; 60" or the use of antimicrobial actives as agents in polymers in "U.S. Pat. No. 5,906,825, Polymers containing antimicrobial agents and methods for making and using same," both of which are indicative of what is known by one of ordinary skill in the art are incorporated herein by reference.

However, many materials will not tolerate the heat and pressure of extrusion. For example, halogens (iodine, chlorine, bromine) and chlorides (PVC) can release corrosive gas that can rapidly attack the machinery and require expensive alloys for protection; however, silver does not present these problems. As an alternative to a polymer-additive, after the polymer fibers are formed, the poly(lactic) acid can be treated by coating, immersion, spraying, printing or any other technique capable of transferring an ingredient or ingredients onto the fibers. The purpose of such treatment could be to promote release of the antimicrobial agent and could include, but is not limited to, water, lactic acid, lactide, organic and inorganic acids and bases, and catalysts.

If the product does not require the application of any absorbent or superabsorbent (SAP) granules or other powder "actives," the web can proceed into winding and die cutting to final size/shape.

If granules are utilized (SAP, for example) a powder spreader is positioned to introduce powder directly into the path of the molten fibers as they are collected above a vacuum source. This vacuum source is a part of a flat belt collector, a dual drum collector or 3-D pocket former for the formation of dimensional and discrete parts. More than one spinning head can be utilized to allow the granules to be positioned generally in the center of the structure. It has been found that several mechanical arrangements are possible and that very high performing structures are possible with a fiber-supported interconnecting structure with SAP. Up to 85% SAP by weight has been tested with the present invention. The SAP can be calendared into/onto the non-woven fiber cores of the present invention.

EXEMPLIFICATION

Example 1

Creation of the PLA Non-Woven Food Pad Insert

Grade 6202D PLA polymer pellets from NatureWorks (Minnetonka, Minn.) were utilized from a fresh unopened bag and introduced into the mouth of a 2.5" 30:1 40-hp extruder and exposed to mechanical shear and heat ranging from approximately 325 to 425° F. as it travels through the system. Filtration followed by a gear pump pushed the molten polymer thru a heated transfer line into a BIAX meltblown system at approximately 800 to 2000 psi. Compressed air was heated to approximately 475-525° F. and introduced into the die at approximately 10-18 psi and used to attenuate the PLA fibers thru nozzles with an internal diameter of about 0.012 inches. A filtered water mist quench was produced using a high-pressure piston pump and a fluid-misting system. This quench was operated at approximately 500-1800 psi and the mist impinges the fibers as they exit the die zone and serves to cool them. An air quench system introduced cool outside air to the fibers before they were deposited on a flat belt with a vacuum source below. The speed of this belt determined the weight of the web. For most food packaging applications a food pad insert from about 10 to about 80 grams per square meter (gsm) is required. The vacuum level additionally served to compress the web, or allow it to remain fluffy and at a low density. Calendar or thermal point bonding served to strengthen the food pad insert and impart strength. An alternative was to place a lightweight (about 14-about 20 gsm) spunbond nonwoven fabric under the web of fibers to impart strength. Once the food pad was calendared it was directed to a windup station for final packaging and assembly. Refer to FIG. 1 for a schematic view of the process.

Following collection on the belt, the web was wound into a roll and delivered to a roll wind up station. In some embodiments, depending on the requirements of the application, this web can be unwound from the station, and passed through a series of rollers and lamination stations, to get conjoined with an equivalent web, to yield a food pad with increased compressibility and mechanical characteristics. Such a web, either one layer or more layers, was cut to fit into clamshell or flexible pouch style containers.

simply between layers of fibers that have already been formed. It can be advantageous to utilize a pressure sensitive adhesive to construct a more robust structure and contain the SAP to prevent particles from dislodging and possibly contaminating the food. In this example an ITW Dynatec (Hendersonville, Tenn.) UFD fiber spray system was used to spray adhesive fibers between the meltblown webs and SAP granules followed by a nip roll to insure good contact with the adhesive. Many adhesives can be used including. In the present example HL 2110 from HB Fuller (St. Paul, Minn.) was used at an application rate of approximately 2-20 gsm. The meltblown/SAP structure then was laminated with exterior films and/or nonwovens as described in Example 1 and then processed into die cutting and used as an absorbent core.

Note that other absorbents can be used also including starch-based superabsorbents as offered by ADM (Decatur, Ill.; formerly Lysac), under several brand names and chemical configurations. An advantage of this brand is that is it made from a 100% natural raw material source which is synergistic with the natural polymers used to form fibers and structures of the present invention.

In terms of the water absorption data, please see Table 1, below. One can observe that the control paper (cellulose-based absorbent pad, similar to products manufactured by Dade Paper (Miami, Fla.), Buckeye Paper Mills (Canton, Ohio), Bartec Paper and Packaging (Cheshire, UK) and others) was saturated essentially by Day 3; however, the Modified (PLA, 2 layers of 33 gsm) pad (starting weight is 16.8 g average) kept on absorbing the excess water throughout the duration of the entire test

TABLE 1

| | Day 1 | Day 3 | Day 6 | Day 8 | Day 10 | Day 13 | Day 15 | Day 17 | Day 22 | Day 24 | Day 27 | Day 29 |
|---|---|---|---|---|---|---|---|---|---|---|---|---|
| Control pad (total wet weight, grams) | 11.0 | 12.0 | 12.0 | 12.0 | 12.5 | 12.0 | 12.0 | 12.0 | 14.0 | 13.0 | 14.0 | 14.5 |
| Modified pad (total wet weight, grams) | 22.5 | 22.0 | 24.5 | 27.0 | 27.5 | 31.0 | 28.0 | | 31.5 | 34.5 | 32.5 | |

As a reference for mechanical properties, the tensile strength of one 33 gsm PLA layer was measured to be 0.765 in/lbs using a Twing-Albert (West Berlin, N.J.) Tensile Tester using ASTM D5035 protocols (as is known to those of ordinary skill in the art). A 66 gsm PLA layer was measured to be 3.884 in/lbs using a Twing-Albert Tensile Tester using ASTM D5035 protocols.

Example 2

Inclusion of SAP in Fibrous Active Structure with Adhesive in PLA Food Pad Insert In this example, superabsorbent polymer (SAP) was added (crosslinked polyacrylic acid grade Favor®Pac 530 from Emerging Technologies/Stockhausen (Greensboro, N.C.); approved by the FDA) as an indirect food additive. The SAP was granular and was dispensed uniformly via a powder spreader produced by Christy Machine Co. (Fremont, Ohio). The granules were dispersed directly into the fiber stream or Example 3

Inclusion of SAP in Fibrous Active Structure without Adhesive in PLA Food Pad Insert We also utilized the dispersion and capture of the SAP between the layers of fibers by calendaring the two film layers. We used a BF Perkins (division of Standex Engraving, LLC, Sandston, Va.) Calendar Station which contained two heated rolls and two hydraulic rams. Each heated roll was filled with high temperature oil, which was heated by a separate machine. A hot oil machine controlled the temperature and the flow of oil through each zone of the Calendar Station. The temperature can range from 110 to 550° F. The hot oil was circulated at 30 psi through 2 inch iron pipes into a rotary valve for each zone.

Figure 2:
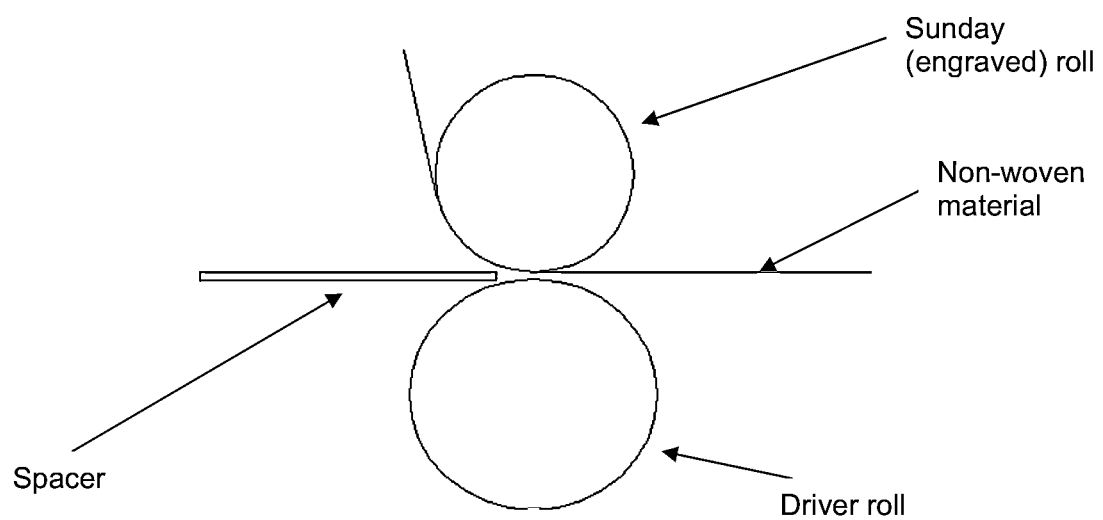
FIG. 2 shows a schematic diagram of an embodiment of the calendaring method of the present invention.

The Calendar Station was opened and closed by a control station which also regulated the amount of pressure used to move the hydraulic rams. This pressure can range from 1 psi to 3,000 psi and maintained the amount of force with which the Drive Roll was supported. A variable spacer between the Sunday Roll (also called an Engraved Roll) and the Drive Roll maintained the distance of one roll to the other. The spacer allowed for the thickness of the PLA and the hydraulic rams maintain that distance. See, FIG. 2 for a schematic representation of the process. Non-limiting specifications are given below. One of ordinary skill in the art will be able to modify these specifications based on the guidance provided by this specification.

i. Top roll, labeled Sunday Roll, was an engraved roll; 7⅜" diameter by 20" length.

ii. Bottom Roll, labeled Drive Roll, was a smooth roll; 10" diameter by 19½" length.

iii. The temperature was variable on product density and speed of the process line. The speed can range, for example, from 1 to 200 FPM (feet per minute) with a temperature of 175 to 350° F.

iv. The distance between the rolls was a variable controlling product thickness which can range from 0.5 to 0.001 inch.

Example 4

Creation of PLA Food Pad with Film and PLA Food Pad Insert

Figure 3:
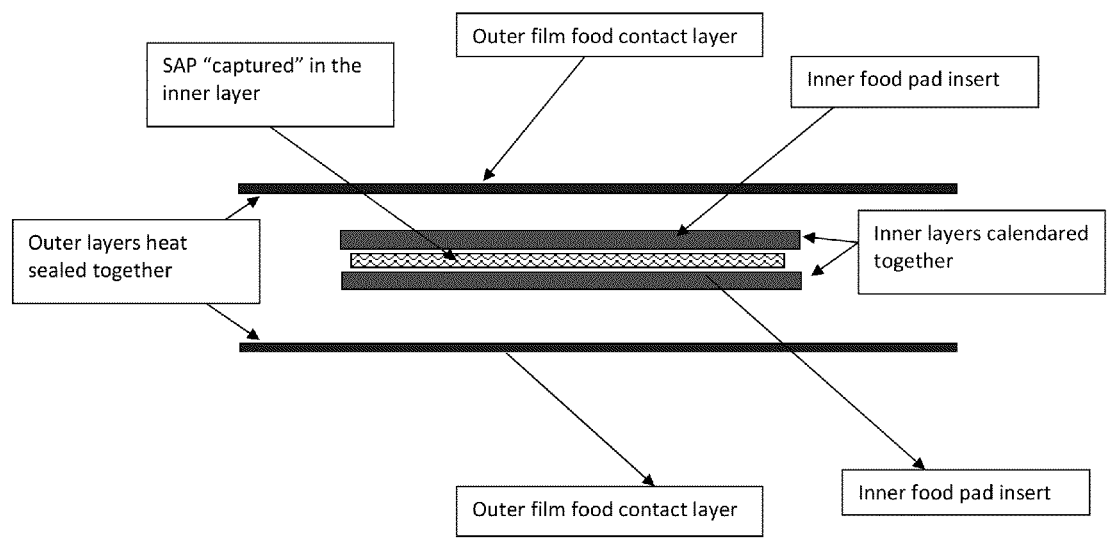
FIG. 3 shows a schematic diagram representing an embodiment of the food pad of the present invention.

The PLA food pad insert was laminated to an olefin perforated or apertured film (the term "aperture" and "aperture film" and similar, refer to film having various degrees of porosity suitable for use with the present invention), 40-Hex pattern, from Tredegar (Richmond, Va.) and cut to a convenient size to fit into a 1-lb clamshell-style container designed for strawberries. The aperture film was placed upward against the food product and the pad/film structure provided mechanical cushioning and antimicrobial action. The silver in the PLA acted as a biocidal agent and slowed the growth of bacteria and fungi on the pad itself. See, FIG. 3 for a schematic representation of an embodiment of the food pad of the present invention.

Example 5

Creation of PLA Food Pad with PLA Film and PLA Food Pad Insert

The PLA food pad insert was laminated to a PLA perforated or apertured film created by uniquely calendaring the PLA fibers. The apertured film was placed upward against the food product and the pad/film structure provided mechanical cushioning and antimicrobial action. The silver in the PLA acted as a biocidal agent and slowed the growth of bacteria and fungi on the pad itself.

1 GLP-1 and 2GLP-1 were sample identifiers for manufactured PLA food pad with PLA film. 1 GLP-1 was two layers of 50 gsm melt spun PLA integrated with a formulation of silver Zeolite grade AC-10D from AgION (Wakefield, Mass.; see, for example, U.S. Pat. No. 6,866,859, incorporated herein by reference), coupled with silver glass grade WPA from Marubeni/Ishizuka (Santa Clara, Calif.) with 30 gsm of SAP. 2GLP-1 was two layers of 33 gsm melt spun PLA integrated with a formulation of silver Zeolite grade AC-10D from AgION coupled with silver glass grade WPA from Marubeni/Ishizuka with 2 gsm of SAP, each were calendared to bond the SAP between the two layers of PLA melt spun. With regard to the edge sealing, the edges were heat sealed on all four edges of the pad/film structure. See, Table 2, below.

TABLE 2

| | Line Speed (feet per minute) | Temperature (° F.) | Calendar Gap (inches) | Thickness (inches) | Tensile Strength ASTM D5035 |
|---|---|---|---|---|---|
| 1GLP-1 W/O Edge Sealing | 20 FPM | 240° F. | 0.015 | 0.019" | 10.724 in/lbs |
| 1GLP-1 W/ Edge Sealing | 20 FPM | 240° F. | 0.015 | 0.019" | 10.470 in/lbs |
| 2GLP-1 W/O Edge Sealing | 120 FPM | 280° F. | 0.009 | 0.016" | 3.684 in/lbs |
| 2GLP-1 W/ Edge Sealing | 120 FPM | 280° F. | 0.009 | 0.016" | 3.808 in/lbs |

Different variations of PLA calendared film, inclusive of apertures, can be manufactured with different mechanical properties based on the teachings of the present specification. For example, PLA Film 1 was calendared 33 gsm PLA integrated with a formulation of silver Zeolite grade AC-10D from AgION coupled with silver glass grade WPA from Marubeni/Ishizuka at 240° F., 40 fpm, at 0.001 inch gap under 900 psi. PLA Film 2 was calendared 66 gsm melt spun PLA integrated with a formulation of silver Zeolite grade AC-10D from AgION coupled with silver glass grade WPA from Marubeni/Ishizuka at 280° F., at 10 fpm, at 0.005 inch gap, under 1,000 psi. Corresponding test data is shown below in Table 3.

TABLE 3

If the corresponding PLA Film 1 and PLA Film 2 were uncalendared, the data is as follows (which clearly shows the effects of calendaring):

| | Tensile Strength (ASTM D5030) | Apparent elongation (%) | Permeation (ASTM E96) (g/hm$^2$) |
|---|---|---|---|
| PLA Film 1 | 2.999 in/lbs | 6.884% | 80.2337 |
| PLA Film 2 | 5.579 in/lbs | 5.064% | 67.7960 |

| | Tensile Strength (ASTM D5030) | Apparent elongation (%) | Permeation (ASTM E96) (g/hm$^2$ |
|---|---|---|---|
| PLA Film 1 - uncalendared | 0.765 in/lbs | 5.886% | 67.4622 |
| PLA Film 2 - uncalendared | 3.784 in/lbs | 3.814% | 64.9974 | g/hm$^2$ = grams per hour times meter squared

As a reference for mechanical properties, the determination of permeation is conducted according to ASTM E96/E96M-10, Water Vapor Transmission of Materials Test methodology using permeation cups by BYK-Gardner (Columbia, Md.) and weigh scale by Mettler Toledo (Columbus, Ohio).

The size of the apertures for PLA Film 1 and PLA Film 2 were measured to be 0.022 inches in diameter. The apertures can be of a given shape (circular, diamond, etc.) as determined by the design of the engraved roll (Sunday roll).

Additional permeation characteristics can be designed with various constructions as exemplified in the Tables 4a and 4b below.

TABLE 4a

| Construction | Permeation ((ASTM E96) (g/hm²) |
|---|---|
| Two layers of 50 gsm uncalendared PLA integrated with a formulation of silver Zeolite grade AC-10D from AgION coupled with silver glass grade WPA from Marubeni/Ishizuka with 50 gsm of SAP in between the said PLA insert layers | 156.7750 |
| Two layers of 50 gsm uncalendared PLA integrated with a formulation of silver Zeolite grade AC-10D from AgION coupled with silver glass grade WPA from Marubeni/Ishizuka without any SAP in between the said PLA insert layers | 171.6458 |
| Two layers of 66 gsm calendared PLA integrated with a formulation of silver Zeolite grade AC-10D from AgION coupled with silver glass grade WPA from Marubeni/Ishizuka with two layers of 50 gsm calendared PLA insert which has 50 gsm of SAP in between the PLA insert layers | 145.0521 |
| Two layers of 66 gsm calendared PLA integrated with a formulation of silver Zeolite grade AC-10D from AgION coupled with silver glass grade WPA from Marubeni/Ishizuka with two layers of 50 gsm calendared PLA insert which has no SAP in between the PLA insert layers | 148.0729 |
| Two layers of 66 gsm calendared PLA integrated with a formulation of silver Zeolite grade AC-10D from AgION coupled with silver glass grade WPA from Marubeni/Ishizuka with two layers of 33 gsm calendared PLA insert which has 2 gsm of SAP in between the PLA insert layers | 155.8896 |
| Two layers of 66 gsm calendared PLA integrated with a formulation of silver Zeolite grade AC-10D from AgION coupled with silver glass grade WPA from Marubeni/Ishizuka with two layers of 33 gsm calendared PLA insert which has no SAP in between the PLA insert layers | 157.4042 |

Shown here are results wherein PLA calendared film was calendared to each other with or without heat sealing to create a stronger and/or more absorbent structure. Additionally, the PLA calendared films can be calendared to the PLA food insert pad and heat sealed. Below is a table (Table 4b) which demonstrates some of the combinations of structures and the corresponding mechanical properties of embodiments of the present invention.

TABLE 4b

| | Thickness (in) | Tensile Strength (in/lbs) |
|---|---|---|
| Two layers of Film1 without insert sealed together. | 0.006 | 6.379 |
| Two layers of Film1 without insert calendared together. | 0.006 | 7.652 |
| Two layers of Film2 without insert sealed together. | 0.018 | 8.276 |
| Two layers of Film2 without insert calendared together. | 0.019 | 10.631 |
| Two layers of Film1 and one layer 1GLP-1 sealed together. | 0.018 | 10.092 |
| Two layers of Film1 and one layer 1GLP-1 calendared together. | 0.028 | >11 |
| Two layers of Film2 and one layer 1GLP-1 sealed together. | 0.034 | 10.664 |
| Two layers of Film2 and one layer 1GLP-1 calendared together. | 0.019 | >11 |
| Two layers of Film1 and one layer 2GLP-1 sealed together. | 0.026 | >11 |
| Two layers of Film1 and one layer 2GLP-1 calendared together. | 0.019 | >11 |
| Two layers of Film2 and one layer 2GLP-1 sealed together. | 0.042 | >11 |
| Two layers of Film2 and one layer 2GLP-1 calendared together. | 0.028 | >11 |

Example 6

Active Structure with Polymer Additives for Lubrication for PLA

This example is similar to Example 1, above, however a polymer additive or masterbatch in dry form was added into the PLA to impart lubricity. When added to the PLA at a 3.0% level higher volumetric throughput rate was observed (higher density; i.e., gsm attainment) while maintaining the same operating pressures, indicating a lower resistance to pumping. The higher volumetric throughput rate was observed by the increased rpm on the melt-pump and extruder motor. The melt additive used was CP-L01 from Polyvel Inc. (Hammonton, N.J.), a multipurpose plasticizer additive. When CT-L01 was substituted, also from Polyvel, at 3% level, lubricant or processing aid for "slip," the same throughput rate at lower extruder and meltpump speeds was observed.

The data below (Table 5) shows the change in density (gsm) for different runs of PLA integrated with a formulation of silver Zeolite grade AC-10D from AgION coupled with silver glass grade WPA from Marubeni/Ishizuka with different process settings and with different levels of additives.

TABLE 5

| | Density, extruder speed (rpm) and meltpump speed (rpm) |
|---|---|
| PLA non-woven food pad insert | 63 gsm, Extruder RPM 12%, Melt Pump RPM 19% |
| 97% PLA with 3% CP-L01 food pad insert | 65 gsm, Extruder RPM 13.5%, Melt Pump RPM 21% |
| 97% PLA with 3% CT-L01 food pad insert | 55 gsm, Extruder RPM 11%, Melt Pump RPM 18% |
| 94% PLA with 3% CP-L01 and 3% CT-L01 food pad insert | 63 gsm, Extruder RPM 11%, Melt Pump RPM 18% |

Similar results (not shown) as above were obtained with polypropylene based on the guidance provided by the present specification for those of ordinary skill in the art.

Example 7

Active Structure with Topical Hydrophilic Treatment Added for PLA

This is similar to Example 1 except the hydrophilic additive was in liquid form mixed into the water quench system and sprayed directly on the fibers while hot. Many surfactants are candidates; however polyethylene glycol (PEG) 200-900 mw is preferred. The concentration used was based on the weight of the fibers strayed and a range of 0.05% to 2.0% has proved beneficial in promoting rapid fiber wet-out. Additionally, the resultant fibrous web demonstrates a more rapid fluid acquisition speed was observed. This enhanced hydrophilicity was advantageous when an absorbent article with rapid fluid uptake was desired. The liquid additive used was Lurol PP-2213 from Goulston Technologies, Inc. (Monroe, N.C.), which is marketed as a single-use surface hydrophilic agent into the hygiene and diaper industry. The results were dramatic as almost immediate wet-out occurs. A similar product also useful in the present invention, Lurol PS-9725-NAD from Goulston, provides immediate wet-out also and is marketed as offering semi-durable performance. Another product, Triton X-100 (Dow Chemical, Midland, Mich.) was also tried successfully. It was applied to a 3×3 inch, 33 gsm PLA food insert pad comprising a formulation of silver Zeolite grade AC-10D from AgION coupled with silver glass grade WPA from Marubeni/Ishizuka, with a water mixture, at 1% and 0.5%. Each sample was fully submerged into a volume of water and then weighed with these results (Table 6).

TABLE 6

|  | Dry Weight (g) | Wet Weight (g) |
| --- | --- | --- |
| 0% Triton X-100 | 0.19 | 0.45 |
| 0.5% Triton X-100 | 0.19 | 1.66 |
| 1% Triton X-100 | 0.19 | 1.72 |

Repeated insult performance is important in food packaging applications, especially for pallet shipments and shipping case quantities where fluid levels may vary. The above samples were re-tested for repeated insult performance by saturating and drying each sample five times to determine if the hydrophilic properties were consistent after multiple uses. The positive results are presented below (Table 7).

TABLE 7

|  | Dry Weight after 5 insults (g) | Wet Weight after 5 insults (g) |
| --- | --- | --- |
| 0% Triton X-100 | 0.19 | 0.75 |
| 0.5% Triton X-100 | 0.19 | 1.86 |
| 1% Triton X-100 | 0.19 | 1.93 |

Similar results as above were obtained with polypropylene based on the guidance provided by the present specification for those of ordinary skill in the art.

A 33 gsm polypropylene material was created with 3% TMP12713, a modifier manufactured by Techmere (Clinton, Tenn.); a 3" by 3" sample was cut and submerged into a volume of water and then weighed. The sample was re-tested, saturated and dried multiple times with these results (Table 8):

TABLE 8

|  | Dry Weight (g) | Wet Weight (g) |
| --- | --- | --- |
| $1^{st}$ insult | 0.19 | 1.85 |
| $5^{th}$ insult | 0.19 | 1.94 |

Example 8

Active Structure with Nonwoven Support Structure Added

This example is similar to Example 1 except a supporting nonwoven pad was positioned above the vacuum conveyor and below the matt of fibers being extruded. This additional layer provided additional strength to the very weak web of fibers allowing the formation of the web to be very loose, fluffy and low density. A low-density web offers greater impact and cushion protection for food, thus lower bruising and spoilage related to bruising. Many suitable spunbond webs are suitable for use in the present invention in view of the teaching provided in the present specification (e.g., PP, PET or PLA polymers with hydrophilic or hydrophobic finishes). For this trial, a 15-gsm SMS web (spunbond/meltblown/spunbond) from BBA Nonwovens (Simpsonville, S.C.) was selected. This is a commodity product used in infant disposable diapers and has a hydrophilic finish with FDA food approval. It is very strong and uniform of its lightweight and does not hinder the formation of a meltblown web on its surface when included in the meltblown process. Depending on the application it can be removed before the finished final product is assembled.

Example 9

Active Structure with Ionic Silver Controlled-Release Antimicrobial Feature

This example is similar to Exhibit 1 except a custom masterbatch containing a slow-release silver ion compound was incorporated to provide broad antimicrobial and antifungal performance. Several silver-releasing materials have been evaluated including, silver Zeolite grade AC-10D from AgION, silver glass grade WPA from Marubeni/Ishizuka, silver zirconium, Alphasan from Milliken (Spartanburg, S.C.). In each case, a 20-30% loading in a carrier polymer was prepared and used to uniformly deliver the silver additive into the mix. One preferred silver agent was the silver zeolite grade AC-10D from AgION which also contained copper elements as an anti-fungal agent. Another preferred silver was the WPA silver glass powder from Marubeni/Ishizuka. Particle size of less-than 5 microns was specified with an average of 2-3 microns to preclude spinneret nozzle clogging. The final concentration of silver in the meltblown fibers was dependent on the quantity of masterbatch used. In trials, up to 20% masterbatch has been processed to demonstrate an extreme loading, up to 5% silver by weight. For the performance required of food packaging, we have found 20 to 1000 ppm loading of actual silver, as a portion of the silver-based additive use with the pad, to be effective. In a food packaging application silver was highly effective as its slow release and long-term bacterial control properties match the end-use requirements. The silver was be placed in a masterbatch with PLA, or an olefin carrier. For PLA fibers, the PLA carrier is preferred to maintain the degradability performance.

To determine the efficacy of antimicrobial formulation, product 3GLP-1 was tested. 3GLP-1 was two layers of about 33 gsm melt spun PLA food pad insert with about 20 gsm of SAP, with the SAP captured between the two layers of PLA with adhesive (as in Example 2) and topical treatment (as in Example 7), and hex-40 film comprising the other film layer (as in Example 4) utilizing the nonwoven support structure (as in Example 8) which was removed prior to the heat sealing of the edges.

26 boxes of lettuce were shipped overnight from California, received in Biovation (Boothbay, Me.) facilities. 13 boxes were "Control" (existing bag packaging in the box, cellulose paper between layers of lettuce and at bottom of package) and 13 were "Modified" (existing bag packaging with Biovation's 3GLP-1 pad at bottom of package, with SAP manufacturing as in Example 2, and the antimicrobial formulation of Example 9). One box (all boxes were stored in 3° C.

walk-in cooler) of each type was opened on every testing day (Mondays, Wednesdays and Fridays, starting with a Wednesday). The packaging materials were tested for aerobic bacteria. Also packaging materials were inoculated with *E. coli* for an antimicrobial challenge test.

When nutrients are present and temp/humidity conditions are acceptable; bacteria will rapidly populate to a level of $10^6$ to $10^8$ cfu/gram. Generally, it is considered that a level of $10^5$ indicates spoilage. Fresh produce with moisture and an environment conducive to growth certainly will support bacterial growth. Many bacteria are "safe" and although the produce may become slimy, there is no health risk and many bacteria are considered as "probiotic." The risks increase with certain strains including, but not limited to, *E. coli, Listeria* and/or *Salmonella*.

In a natural environment, a broad range of organisms thrive and constantly compete for available resources; nutrients, moisture, etc. It is unusual for one organism to dominate the others and even if this occurs, the lives of bacterial organisms is so short, the dominant situation rapidly reverts back to a complex bacterial flora, all in competition for resources. Many bacteria reproduce on a 20-min cycle which leads to an explosive logarithmic growth phase. This phase ends when nutrients are limited or toxins develop from dead bacteria.

Aside from testing to determine the type of bacteria present, basic microbiological testing is often conducted to determine population counts and population reduction ability of the packaging or processing technique. Microbiological testing of food products is well established and many protocols are available to those of ordinary skill in the art, especially for antimicrobial and "active" materials.

Bacterial populations (colony forming units, cfu) were determined with standard methods. When required, recovered samples were incubated at 37° F. for 24-hrs. Serial dilution, each step was 1-log, were conducted using Butterfield's solution as the diluent. One ml samples were taken using an electronic pipette and non-selective 3M #4604 Aerobic Bacteria Petrifilm™ plates (3M, St. Paul, Minn.). Following a 36-48-hr incubated growth phase, manual readings of the plates were taken and recorded. Populations of bacteria were recorded as CFU/ml of fluid. Bacterial count tests were also performed using 3M #6417 plates with 5-day incubation periods. Duplicate testing was performed for added accuracy. The two readings were averaged for reporting.

Figure 4:
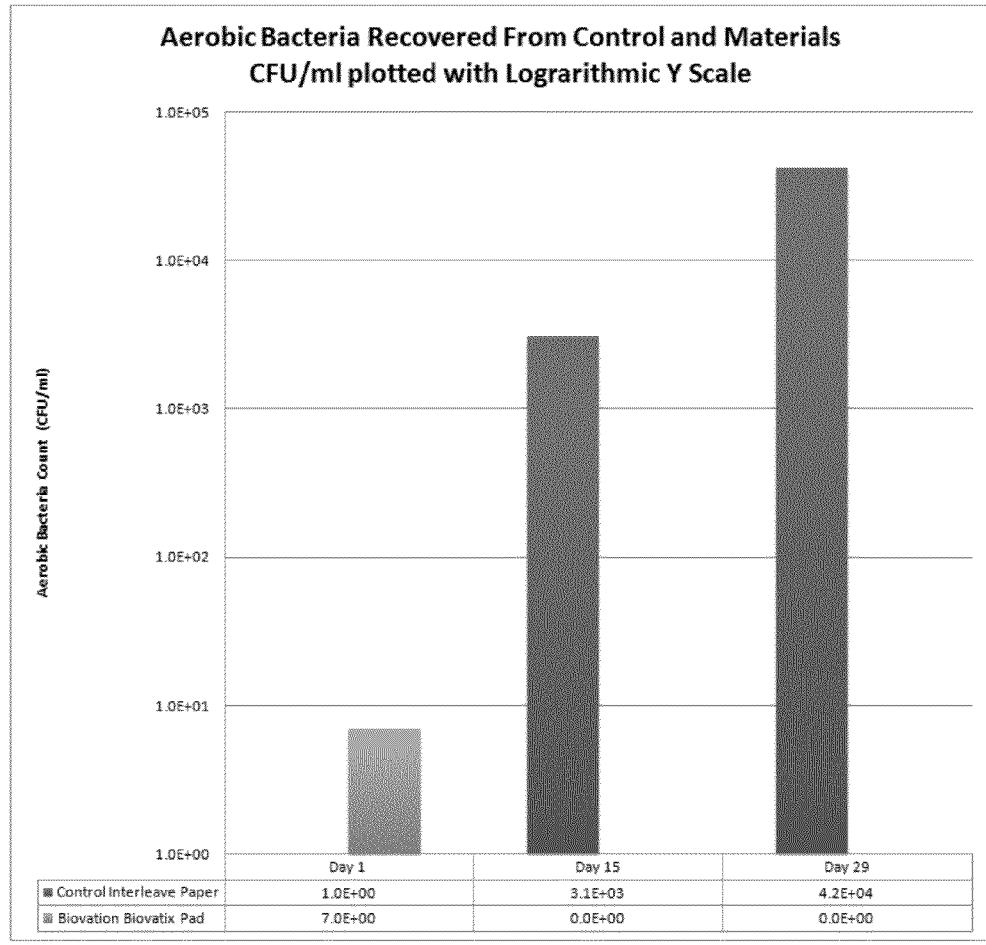
FIG. 4 shows effectiveness of an embodiment of the food pad of the present invention with regard to bacterial kill.

As can be seen in FIG. 4, high levels of aerobic bacterial activity in Day 15 and Day 29 were observed for the Control Paper. The materials of the present invention did not indicate the presence of any aerobic bacterial colonies. This was expected as the materials were formulated with Biovation's FDA approved food grade antimicrobial and antifungal agent(s). The agent used in the Example performed as expected and prevented the growth of bacteria. Note the low bacterial counts on the "Modified" material on Day-1. The antimicrobial used in the present invention is a long-duration type antimicrobial agent with a safe but slow activation period. This system generally takes 24-hrs to show strong performance.

For the antimicrobial challenge test sample sizes were generally 2 inch square or 1"×4" rectangular. For thin materials, like the "control" cellulose paper, a flat test method using a sterile cover sheet was found to be suitable. This test was essentially the same as the JIS Z 2801 protocol, also known as ISO 22196, a global standard. The absorbent pad was tested with a widely accepted textile standard AATCC-100 which determines antimicrobial effectiveness in fibrous materials. It was also acceptable (equivalent) to use a spray technique to deliver a uniform level of bacteria as compared to flooding the sample, as with AATCC-100. Everything else remained equivalent the only difference being that the bacteria were delivered differently.

Pure certified strains of bacteria were purchase from ATCC and were received lyophilized or freeze dried. For this study we selected *E. coli* because it is an organism of most concern for the produce industry. *E. coli* #8739 is routinely used in antimicrobial testing and all labs carry it. It is considered as BioHazard Level 2 organisms and is regulated and requires moderately advanced lab conditions and safety procedures. Biovation performed these tests internally in their facility.

The bacteria were maintained in a liquid sample that allowed it to grow. To be able to count the population, the concentration of bacteria was diluted as levels of 1,000,000 colonies and higher per ml were very common in the experiments described here. Highly accurate electronic pipettes and premeasured dilution bottles were used. Serial dilutions of 9:1 were performed. The petri film, plate or dishes were read following 48-hrs of incubation. The technician visually determined which plates could be read and calculated the concentration after considering the dilution factor.

Test protocols that were followed herein are outlined below:

Grow a pure strain of the organism of choice in nutrient broth or agar. Most organisms will grow to a population density of $10^6$ to $10^8$ cfu/gram; CFU=colony forming units.

Adjust the population density to a known value so a "starting point" is determined.

Introduce or inoculate a small quantity of the test bacteria on the product to be tested. A food source is provided along with ideal growing conditions in an incubator. Note that actual "real life" conditions can also be utilized, such as chilled temperatures or temperature cycling.

Place a known quantity of bacteria and fluid on a known sample size of the pad or film. Generally duplicate or triplicate samples are used for accuracy.

Allow the inoculated bacteria to grow (or be killed by the "active") over a fixed period, generally 18-hrs to 48-hrs. A negative control is included in the testing as this establishes the baseline for comparison.

Following the incubation phase in which the food or packaging material is exposed to the bacteria, extract the bacteria for population determination. This extraction can be via simple fluid collection if a film or pad surface is involved. Vortexing or can be used to assist in collection. The goal is to recover remaining live bacteria for counting.

Immediately following this collection step, the "active" or antimicrobial must be neutralized to prevent further activity. A neutralizer solution is used, one specific to the antimicrobial used (e.g., BD Diagnostic Systems, Dey/Engley D/E Neutralizing Broth). Care must be taken to not harm the bacteria or slow their growth while stopping the antimicrobial activity and a "neutralization verification" protocol is run to determine this.

Following neutralization, the population of remaining bacteria is counted. This is done visually on agar plates or films. The agar is chosen to provide a suitable growth media for the organism used. A wide variety of suitable agars and nutrient plates are available commercially.

Because cfu, or colony forming units, are counted the concentration must be adjusted to provide a density that can be accurately counted. Too high and a lawn of bacteria is observed and cannot be counted. A known quantity of fluid containing the neutralized and recovered bacteria is in placed on the agar plates and diluted in serial steps, each step being 1-log or 10× population reduction. Generally 5 or 6 dilution steps are required.

These agar plates, each with a known dilution, are placed into an incubator to provide ideal growth conditions, generally for 48-hrs.

Visually look at the plates and determine which dilution step has a "countable" number of cfu's. Count the bacteria and determine the population density of live bacteria. Also count the "control" sample.

The performance of the "active" or antimicrobial packaging is determined by the population reduction of cfu's or log reduction reported in percent reduction.

Figure 5:
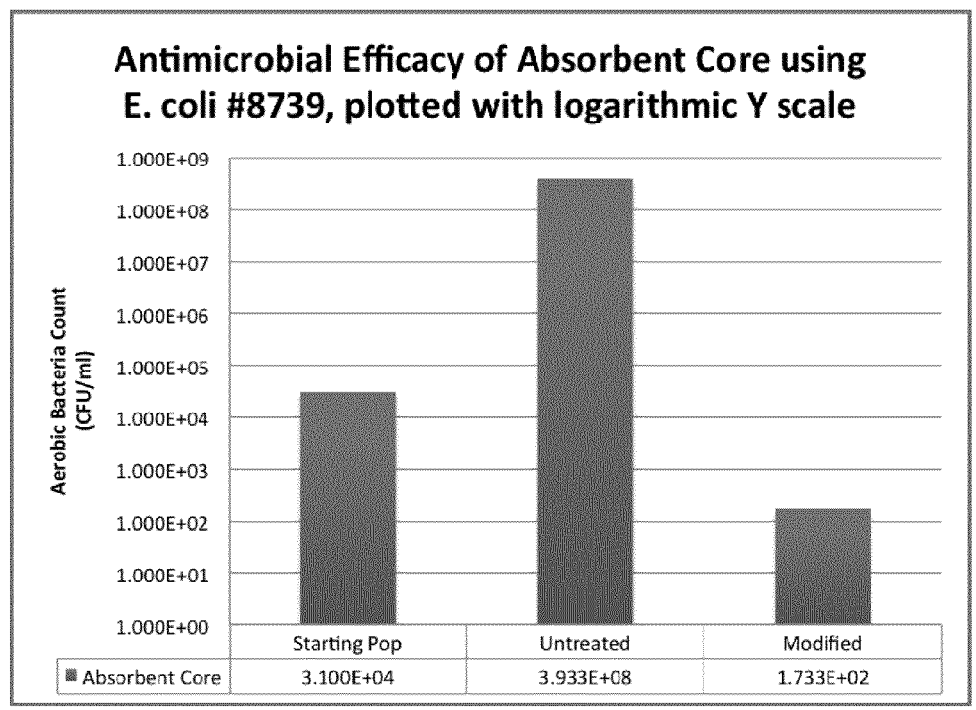
FIG. 5 shows antimicrobial efficacy of the absorbent core of an embodiment of the food pad of the present invention.

Refer to Table 9, below, and FIG. 5. From the starting point, the untreated samples (which can also be considered equivalent to the Control paper) allowed dramatic microbial growth while the treated sample reduced the population dramatically.

TABLE 9

|  | Population Reduction (%) | Log Reduction |
| --- | --- | --- |
| Treated vs. Startin Pop | 99.44086% | 3.083E+04 |
| Treated vs. Control | 99.99996% | 3.933E+08 |

These data indicate an unexpectedly strong performance as a contact antimicrobial for the 3GLP-1 test sample. Bacteria absorbed into the core were effectively killed; a 4-log kill (99.99996%) kill rate is considered by those of skill in the art to be the required and effective range of industrial performance benchmarking.

Finally, a detailed visual inspection was carried out on 3GLP-1 and there was absolutely no discoloration or speckling (which was present on the control cellulose paper), demonstrating the positive benefits of the antimicrobial agents in the non-woven material.

Example 10

Active Structure Made with Polypropylene Polymer

This is similar to all above examples with the exception of polypropylene polymer (PP) is substituted for the PLA. The advantage of PP is a higher processing and throughput speed. PP has all the required health and safety and low-bioburden properties food packaging require. It is also receptive to hydrophilic additives in a masterbatch or surface treatment to impart rapid fluid wet-out. Additives can easily be included in masterbatch form. A PP meltblown web can also be thermally point bonded or placed on a spunbond carrier for additional strength and can be processed in a secondary treatment step to impart an silver-containing treatment.

In this example we used ExxonMobil (Houston, Tex.) Achieve 6936G ultra-high melt flow rate polypropylene at the 100% level and with additives. One distinct advantage was lower melt processing conditions when compared to PLA. Extruder and spinning temperatures in the 275 to 350° F. range were sufficient and this product and this allowed polymer additives that were heat-intolerant to be utilized.

The below table (Table 10) shows the particulars of a 3GLP-1 all PP sample manufactured on the meltblown line. 3GLP-1 consists of two 50 gsm PP melt spun layers and 25 gsm of SAP, calendared to bond the SAP between the two layers of PP.

TABLE 10

|  | Line Speed | Temperature | Calendar Gap | Thickness | Tensile Strength (ASTM D5035) |
| --- | --- | --- | --- | --- | --- |
| 3GLP-1 W/O Edge Sealing | 10 FPM | 250 F. | 0.005 | 0.019 | 5.65 |
| 3GLP-1 W/ Edge Sealing | 10 FPM | 250 F. | 0.005 | 0.019 | 3.951 |

Melt spun PP of various densities and thicknesses were calendared at a close nip under high pressure to produce a film structure. See test data below (Table 11) to see the various structures created and the performance difference between "calendared" and "uncalendared."

The 33 gsm melt spun PP was calendared at 210° F., at 10 fpm (feet per minute), at 0.001" gap, under 1000 psi, to create "PP Film 1".

TABLE 11

|  | Tensile Strength (ASTM D5035) | Apparent Elongation |
| --- | --- | --- |
| PP Film 1 - Un-Calendared | 1.253 in/lbs | 29.302% |
| PP Film 1 - Calendared | 2.294 in/lbs | 15.78% |

A 48 gsm melt spun PP was calendared at 250 F, at 10 fpm, at 0.005" gap, under 1,000 psi, to create "PP Film 2," see, Table 12.

TABLE 12

|  | Tensile Strength (ASTM D5035) | Apparent Elongation |
| --- | --- | --- |
| PP Film 2 - Un-Calendared | 1.788 in/lbs | 23.398% |
| PP Film 2 - Calendared | 3.789 in/lbs | 8.475% |

Example 11

Creation of a PP Food Pad with PP Food Pad Insert with PLA Fill

Similar to Example 5, a polypropylene food pad can be constructed with polypropylene food pad inserts as demonstrated in Example 11, with PLA film on the top and bottom outer layers. The polypropylene food pad inserts can be calendared, or uncalendared, wherein the PLA film can be of the calendared type also described in Example 5. The PLA film would be heat sealed on all four edges with the PP food pad insert captured in the center of the total substrate.

Example 12

Creation of a PLA Food Pad with PLA Food Pad Insert with PP Film

Similar to Example 5, a PLA food pad can be constructed with PLA food pad inserts as mentioned in Example 1, 2, 3, 4 and 5, with PP film on the top and bottom outer layers. The polypropylene film would be calendared with the hydrophilic additive as mentioned in Example 7. The PP film would be heat sealed on all four edges with the PLA food pad insert captured in the center of the total substrate.

Example 13

Active Structure Made with Polycaprolactone Polymer

This is similar to Example 1, above, with the exception that Polycaprolactone (PCL) is added to the PLA in a blend at various levels from 5% to over 70%. PCL is a naturally derived polymer with a very low melt point. When used at low levels, generally 30% and lower, it functions as a plasticizer for the PLA, a brittle polymer, and imparts lubricity and softness to the fibers that functions to reduce breakage. This dramatic improvement was apparent even at a 2% add-on level and increases with concentration. The PLA/PCL blend incorporated masterbatch additives or surface finishes to modify the hydrophilicity and fluid wet-out speed. Silver was also incorporated. The lower processing temperature of the PCL allows the use of low-temp additives but also limits the effective storage and use temperatures of the finished product.

Below, Tables 13 and 14 show the physical property of various PLA/PCL structures that were manufactured with different mechanical properties. For example, PLA/PCL Structure UC-1 was non-calendared 600 gsm 93% PLA with 3% CP-L01 and 3% CT-L01 and 1% PCL run at 400 F, 3 fpm and 1100 psi. Corresponding test data is shown below for various combinations and permutations wherein the speed, pressure and temperature were changed.

TABLE 13

| | Tensile Strength (ASTM D5035) | Apparent elongation (%) | Break Time (sec) |
|---|---|---|---|
| PLA/PCL Structure UC1 | 0.732 | 28.996 | 4.375 |
| PLA/PCL Structure UC2 | 0.937 | 14.131 | 2.141 |
| PLA/PCL Structure UC3 | 1.109 | 16.356 | 2.547 |
| PLA/PCL Structure UC4 | 1.837 | 12.024 | 1.843 |
| PLA/PCL Structure UC5 | 1.731 | 21.465 | 3.313 |
| PLA/PCL Structure UC6 | 1.347 | 22.304 | 3.391 |
| PLA/PCL Structure UC7 | 1.840 | 23.915 | 3.609 |
| PLA/PCL Structure UC8 | 1.360 | 10.460 | 1.594 |
| PLA/PCL Structure UC9 | 1.375 | 18.804 | 2.844 |
| PLA/PCL Structure UC10 | 1.767 | 17.139 | 2.734 |
| PLA/PCL Structure UC11 | 1.730 | 25.954 | 4.000 |
| PLA/PCL Structure UC12 | 1.316 | 21.022 | 3.250 |
| PLA/PCL Structure UC13 | 0.797 | 22.914 | 3.469 |
| PLA/PCL Structure UC14 | 1.176 | 15.248 | 2.312 |
| PLA/PCL Structure UC15 | 0.755 | 27.581 | 4.157 |
| PLA/PCL Structure UC16 | 0.851 | 19.247 | 2.906 |
| PLA/PCL Structure UC17 | 1.205 | 20.022 | 3.094 |
| PLA/PCL Structure UC18 | 1.118 | 23.247 | 3.562 |

The mean is 1.277 lbs for tensile strength, 20.046% for apparent elongation and 3.063 sec for break time.

TABLE 14

By calendaring various samples, the following data was obtained:

| | Tensile Strength (ASTM D5035) | Apparent elongation (%) | Break Time (sec) |
|---|---|---|---|
| PLA/PCL Structure 1 | 1.957 | 18.478 | 2.797 |
| PLA/PCL Structure 2 | 1.636 | 15.690 | 2.468 |
| PLA/PCL Structure 3 | 1.702 | 16.475 | 2.500 |
| PLA/PCL Structure 4 | 1.621 | 14.251 | 2.157 |
| PLA/PCL Structure 5 | 1.357 | 12.808 | 1.937 |
| PLA/PCL Structure 6 | 2.032 | 12.911 | 1.953 |
| PLA/PCL Structure 7 | 1.117 | 23.799 | 3.593 |
| PLA/PCL Structure 8 | 1.481 | 10.696 | 1.704 |
| PLA/PCL Structure 9 | 2.268 | 19.359 | 3.000 |
| PLA/PCL Structure 10 | 2.221 | 17.755 | 2.750 |
| PLA/PCL Structure 11 | 2.185 | 22.342 | 3.375 |

The mean is 1.780 lbs for tensile strength, 16.779% for apparent elongation and 2.567 sec for break time

Example 14

Apertured Film and/or Structure with "Actives" and Coloration

This is identical to Example 4 and 5 except the apertured film was pigmented to match the color of the food or berry or the exudate of the food. The color of the film can also be white or another contrasting color to enhance the visual appearance of the package. This was simply to present a pleasing consumer package. The final construction of the absorbent pad utilized film on two sides, top and bottom.

In a similar design, one or both of the films was spunbond or SMS layered on the calender bonded surface of the PLA or PP fibers themselves. There are many options. In this example, two layers of white pigmented 40-Hex Tredegar apertured film, including 5% masterbatch with WPA silver glass antimicrobial, were utilized and the edges were thermally sealed with heat/pressure. This film offers a one-way flow feature and the flow is inward, into the absorbent pad.

The testing conditions and protocol denoted in detail in Example 7 was also used to test the performance of the film (which though is 40-hex Tredegar film in the test, can be manufactured from PLA as mentioned in Example 5).

We measured the bacterial count translated to 449,460,000 ($4.5 \times 10^8$) total colonies per box, on average. This was a large number but there is a very large surface area of lettuce and the concentrate per leaf is really quite low. The risk however, was the potential for explosive growth with a strain that is pathogenic and can cause illness, or death. With certain bacteria, it can reportedly (and is known to those of ordinary skill in the art) take as few as 100 colonies to cause illness in humans.

With this as a starting point, we made several assumptions.
1. That the 500 g of lettuce sampled from the top layer is representative of the entire box.
2. That a "worst case" is for 100% of those bacterial colonies to become exposed to the packaging materials.
3. That the *E. coli* strain selected, ATCC #8739, is representative of bacterial contamination found on the lettuce leaves.
4. That the distribution of colonies is uniform and not highly concentrated.

A known number of colonies and a certain area were used in the "treated" materials with which to control these colonies; 0.495 square meters of film with all layers combined, and, 0.090 square meters of pad surface. It is unlikely that the vast majority of these bacteria will never contact the packaging materials; however, if all did, that would become a "worst case" scenario.

In the lettuce box, the absorbent pad was observed to increase in weight as it picked up free moisture. Experience gained in other food packaging investigations using chicken, beef and fish indicates that in food packaging, this free fluid is often laden with bacteria. This leads to the last assumption.

5. That 80% of the bacteria are mobile in the free fluid and this fluid ends up being contained in the absorbent pad and 20% are exposed to the apertured film layers.

With these assumptions it was concluded that to simulate the "worst case" bacterial exposure, the apertured film surface should be inoculated with $1.81 \times 10^8$ colonies per square meter. The test protocol was carefully calibrated to deliver these levels.

To expand this range and gain a better understanding of the performance of these materials, several other concentrations were used in addition, both higher and lower concentrations.

TABLE 15

| Level | Target Loading On the Film (CFU/sq meter) |
| --- | --- |
| Plus 1-log | $1.81 \times 10^9$ |
| Target Bacterial Exposure | $1.81 \times 10^8$ |
| Minus 1-log | $1.81 \times 10^7$ |
| Minus 2-log | $1.81 \times 10^6$ |
| Minus 3-log | $1.81 \times 10^5$ |

Please recognize that this was a unique customized protocol in which a challenge test was performed by loading or inoculating materials with a carefully controlled bacterial loading of different concentrations.

Controlled atomization was used for the apertured film and a traditional direct fluid inoculation was used for the absorbent pad. All materials were provided with additional moisture in the form of a sterile buffered misting. All samples were of a known size for ease of calculation. This size was a circle of exactly 1/100 of a square meter. A James H. Heal (Halifax, UK) model 230 circular sample cutter delivered very precise samples.

All inoculated samples were placed in sterile glass jars, with a lid, and incubated for 24-hrs at 37° C., a standard setting. Following incubation, sterile D/E Neutralizing Broth was used to deactivate the antimicrobial system but not hinder the growth of bacteria. Serial dilutions were made using serial Butterfield's Buffer and 3M Petrifilm Plates (3M, St. Paul, Minn.) were used to culture the viable colonies. Following a 48-hr incubation period, colonies were counted.

Figure 6:
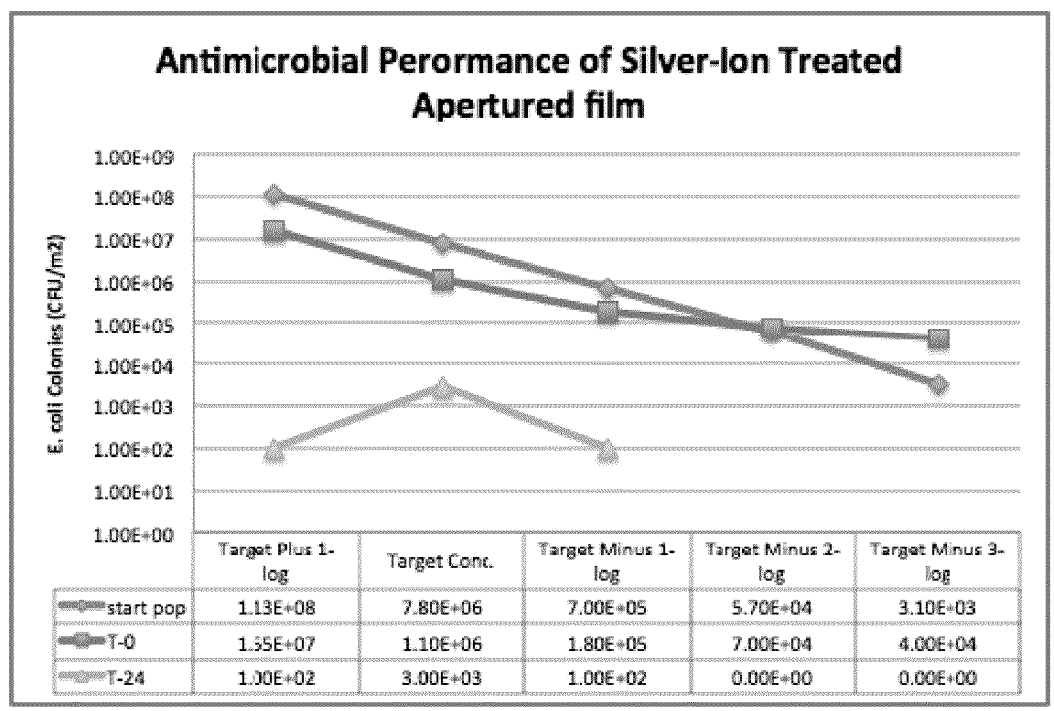
FIG. 6 shows performance of the silver-ion treated apertured film of the present invention.

These data were from the apertured film (see, FIG. 6) that is used as the outer layer of the food absorbent pad. There was a controlled release silver-ion system embedded in the film, as described above.

The blue line (diamonds) was the population of the *E. coli* inoculum as diluted to the five different concentrations. The colony count was very linear and as-planned.

The red line (squares) was the Time-Zero (T-0) measurement. This was a measurement made to determine the logical base-line of performance. To obtain this, immediately after inoculating the film, the D/E Neutralization step was conducted and the broth was plated and incubated. This accurately determined the number of colonies placed on the sample. Notice how closely it matches the blue line.

The green line (triangles) was the count of colonies recovered following a 24-hr exposure to the antimicrobial film. There are several Zero readings which did not plot. Note the concentration was plotted using a logarithmic scale so each horizontal line indicates a 10× change in colony count. The film indicates strong antimicrobial properties against *E. coli*.

Figure 7:
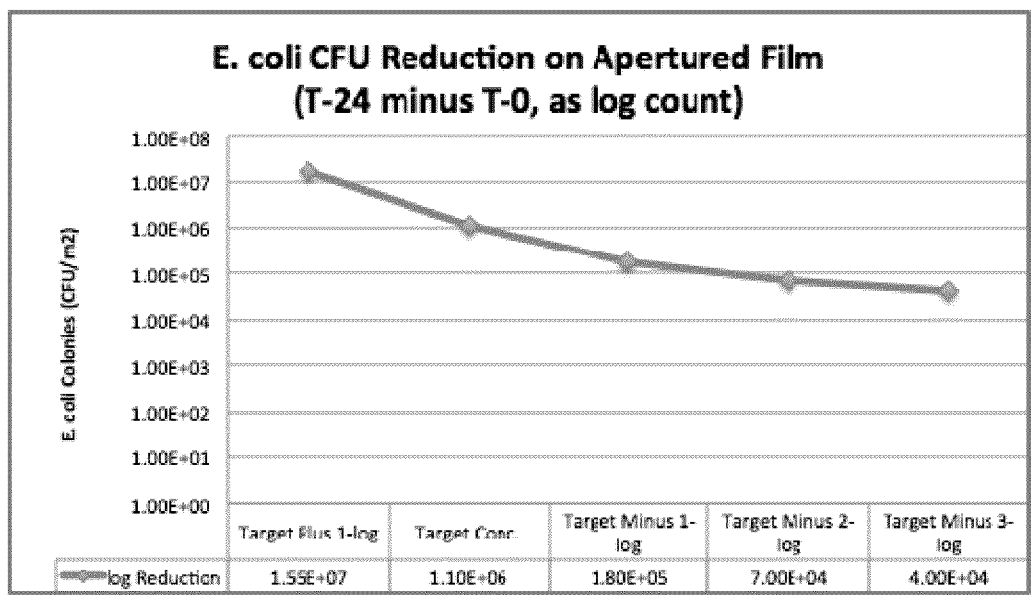
FIG. 7 shows $E.\ coli$ CFU reduction as log count on an apertured film of the present invention.
Figure 8:
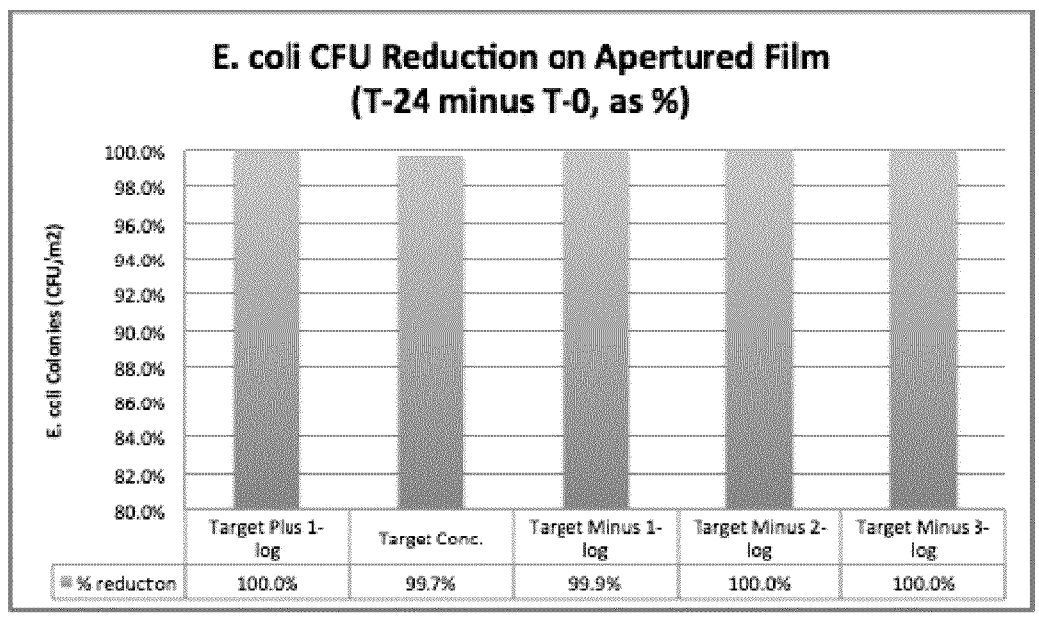
FIG. 8 shows $E.\ coli$ CFU reduction as percent on an apertured film of the present invention.

There are two other ways to view these same data, the log reduction (see, FIG. 7) and the percent reduction (see, FIG. 8). The antimicrobial performance of the apertured film was impressive and unexpected with an average of 99.93% reduction in bacteria.

Example 15

Fiber Diameter Influence on Performance

Figure 9:
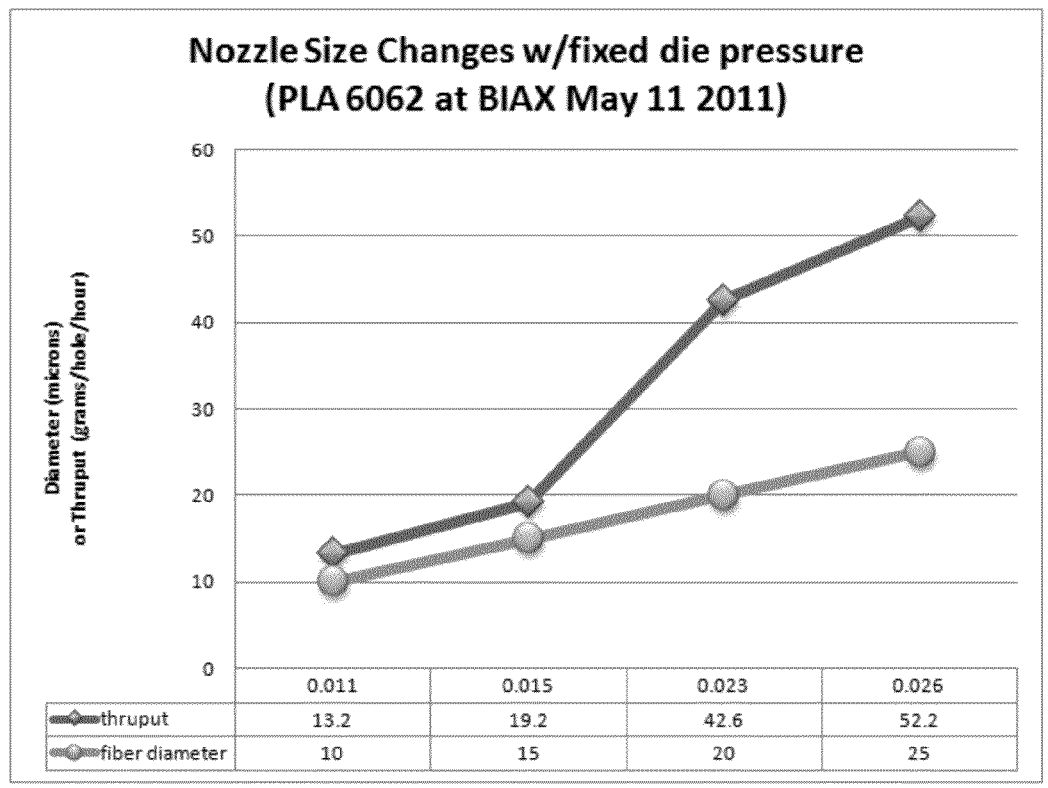
FIG. 9 shows effect of nozzle-size changes on the production of the polymer fiber of the present invention.

By varying the thru put rate of the molten polymer and the air used for attenuation, the fiber diameter and degree of polymer orientation within the fiber may be modified. Additionally, the internal diameter of the polymer nozzles, in the die or spinneret plate can be modified. In this example the polymer and thru put rate was held constant while spinneret plates with different diameters were utilized and the effect of fiber diameters was measured. Extruder zone temperatures, die-head temperatures and pressures, collector belt speed and quench air settings were optimized. Diameters ranging from 0.011 to 0.023 were evaluated and resultant changes in fluid management and physical cushioning were observed. An experimental trial matrix and performance data follow in Table 16 and FIG. 9.

TABLE 16

| Thru put | g/hole/hour | 13.2 | 19.2 | 42.6 |
| --- | --- | --- | --- | --- |
| Fiber Diameter | μm | 10 | 15 | 20 |
| Nozzle ID | inches | 0.011 | 0.015 | 0.023 |

Figure 10:
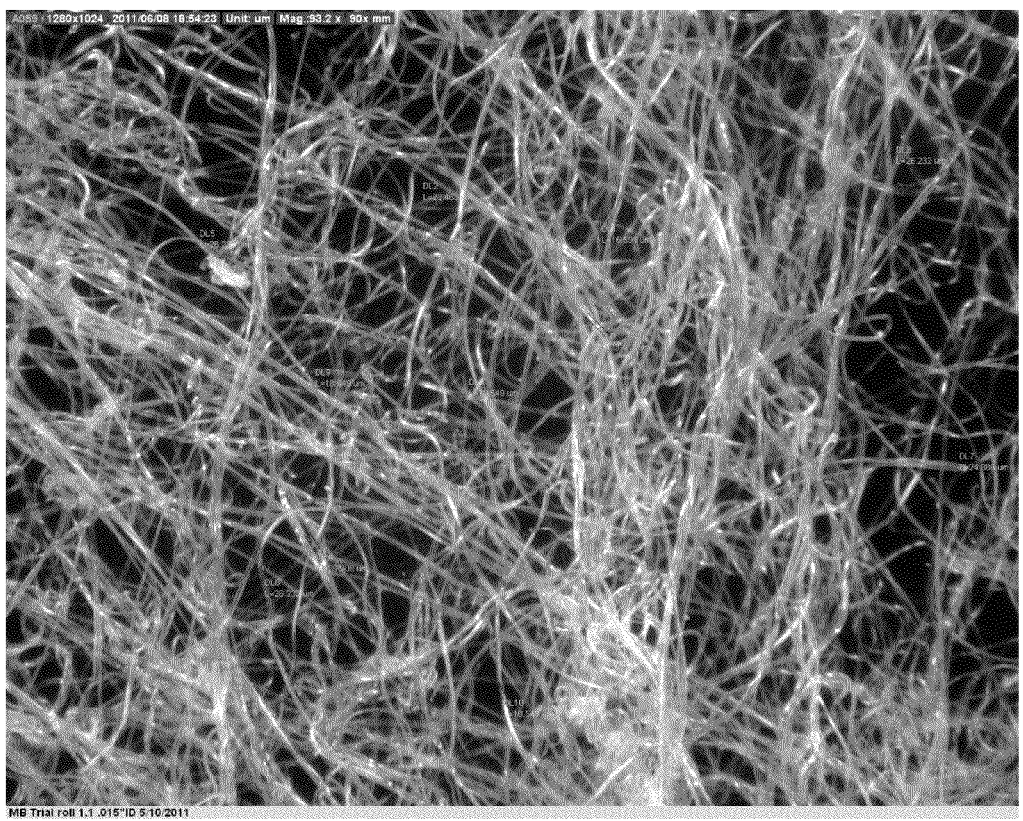
FIG. 10 shows a micrograph of the polymer fiber of the present invention.
Figure 11:
FIG. 11 shows a magnified photograph of 0.015 inch fibers of the PLA insert in a cross-section of the non-woven pad construction with fiber direction being transverse to an exterior surface.
Figure 12:
FIGS. 12 and 13 show the partially vertical surface is the side of the insert at higher magnification.
Figure 13:
Figure 14:
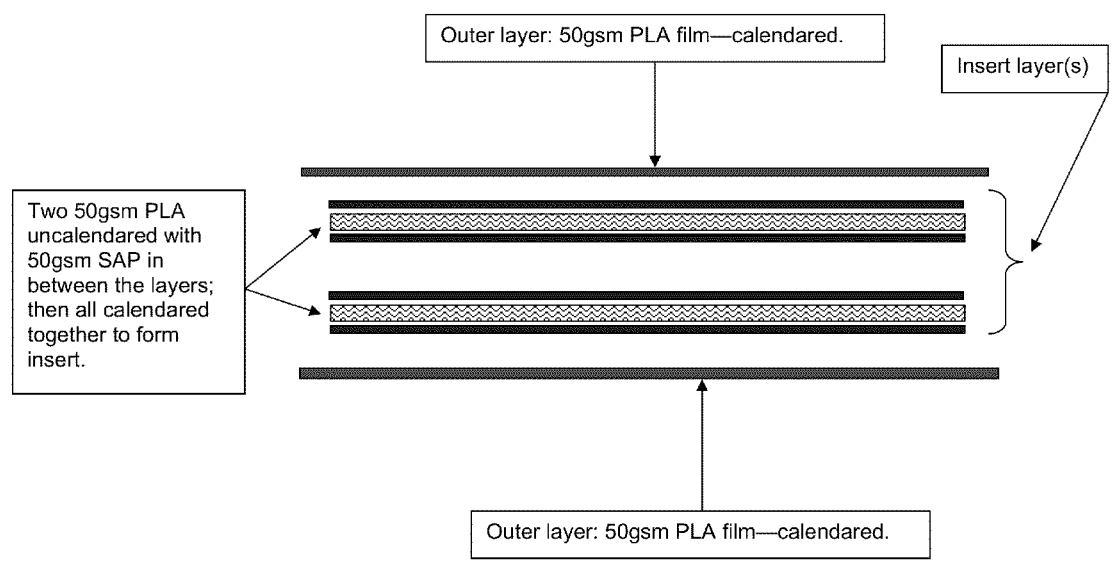
FIG. 14 shows a schematic representation of a layered configuration of two calendared non-woven food pad cores surrounded with outer layer surface films.
Figure 15:
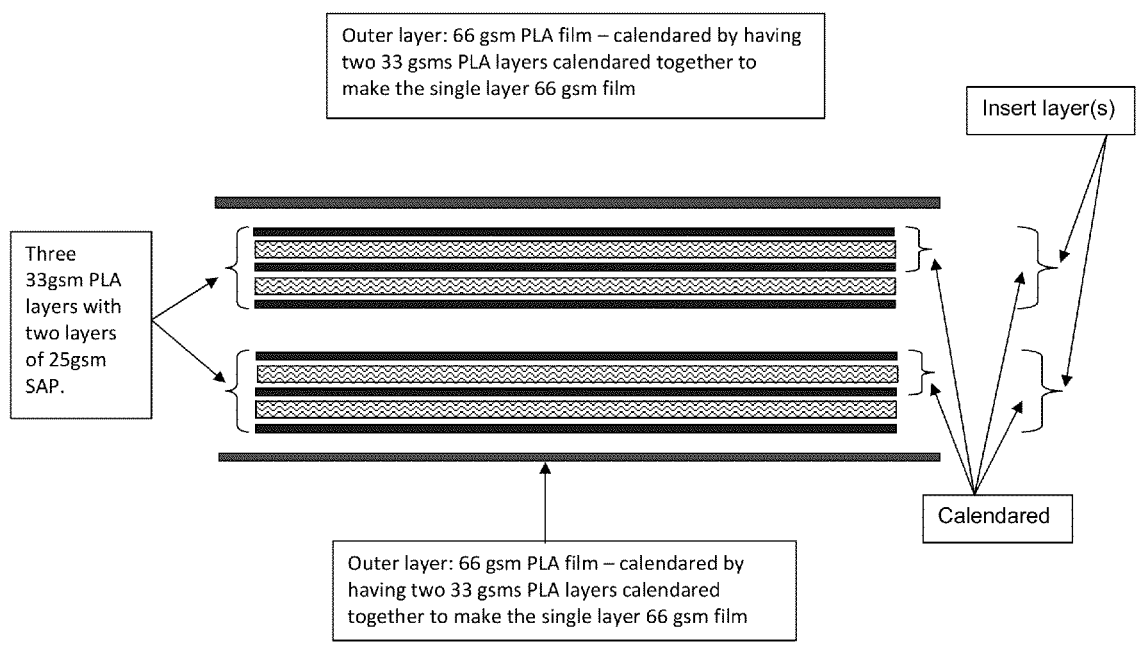
FIG. 15 shows a schematic of a second layered configuration of the present invention.

FIG. 10 shows a magnified photograph of fibers from 0.015 inch nozzle. FIG. 11, FIG. 12 and FIG. 13 show a magnified photograph of 0.015 inch fibers of the PLA insert in a cross-section of the non-woven pad construction with fiber direction being transverse to an exterior surface. FIG. 11 shows the pad insert orientation wherein the top surface is the horizontal surface on the photograph, and the side of the insert is the vertical surface. In FIGS. 12 and 13, the partially vertical surface is the side of the insert, in an even more magnified photograph.

Example 16

Substrate Construction Methodology Influence on Air Permeation

For all the examples mentioned above, it is important to note that the method of construction of the food pad inserts and films themselves, and in concert with being calendared and assembled with one another has a direct influence on the air permeation value. And hence, this affects the ability of the complete food pad to either absorb moisture and/or water and also concurrently to "breathe" so as to not trap any air under it. The table above shows the different levels of air permeation for the various food pad inserts and films that have been manufactured.

Example 17

Layered Pad 1

This pad is constructed with two outer layers of PLA film and two insert layers of PLA and SAP. The film layers are 66 gsm PLA with a 2% CP-L01 (Polyvel) additive, calendared at 280° F. at 10 fpm. See, FIG. 16. This outer layer of film adds strength and contains any SAP that would otherwise spill out of the insert layer. The tensile strength of the film is 5.579 in/lbs and is perforated during calendaring with an engraved roll (Sunday roll); the aperture size is "diamond shaped" and is approximately 0.022 inches in diameter. Triton X-100 (Dow) was applied as surfactant to each outside surface of the outer film before edge sealing to impart hydrophilic characteristics to the PLA.

Each of the two insert layers were constructed of two layers of 50 gsm PLA. A power spreader (Christy Machine Co, Freemont, Ohio), at 50% motor rpm, was used to apply 50 gsm of SAP between the two layers. This was then calendared at 240° F. at 30 fpm to bond the two layers together with the SAP in between. This insert roll was then cut into the size needed for the product application, and lightly misted with the surfactant. Two inserts for each pad were used to increase the total capacity of the absorbent pad.

All the PLA layers were comprised PLA fibers incorporating a formulation of silver Zeolite grade AC-10D from AgION coupled with silver glass grade WPA from Marubeni/Ishizuka.

The film layers were edge sealed on a single side using a ¼" band, impulse foot sealer (American International Electric, Whittier, Calif.) at the "4" dial setting. Two insert layers were placed at the edge of the seal and then the remaining three sides were sealed. In this application the insert layers were cut to 3" by 3" and the film was cut at 3½ by 3½.

The absorbent capacity of this pad is 45-50 g of water completely saturated. Each pad weighs an average of 2.3 g and was then submerged in water for 60 sec. After a drip time of two minutes the pad weighed 34 g. The pad was then submerged again for sixty minutes, allowed a three minute drip time and re-weighed. The end result of 47 g full saturated. Up to the point of full absorption (defined as the point of absorption where there is a visual rupture in the edge seal of the food pad), the food pad thickness went from 0.068 inches (dry) to 0.65 inches (wet).

Example 18

Layered Pad 2

Two 33 gsm PLA film layers, integrated with a formulation of silver Zeolite grade AC-10D from AgION coupled with silver glass grade WPA from Marubeni/Ishizuka were calendared together, at 240° F., 50 fpm, at 0.001" gap under 1000 psi to create a single outer film layer. See, FIG. 17.

A similar single outer film layer can also be made from 50 gsm PLA with a 2% CP-L01 (Polyvel) additive, calendared at 220° F. at 20 fpm.

An inner insert layer was constructed in the following fashion: Two 33 gsm PLA non-woven uncalendared layers, integrated with a formulation of silver Zeolite grade AC-10D from AgION coupled with silver glass grade WPA from Marubeni/Ishizuka, were calendared (230° F., 50 fpm, at 0.001" gap under 1000 psi) with 25 gsm SAP (using a powder spreader, Christy Machine, Freemont, Ohio, at 20% motor rpm) captured in between the layers. Then, another 33 gsm PLA non-woven uncalendared layer, integrated with a formulation of silver Zeolite grade AC-10D from AgION coupled with silver glass grade WPA from Marubeni/Ishizuka, was calendared (250° F., 50 fpm, at 0.001" gap under 1000 psi) to the aforementioned pre-calendared two layers, with 25 gsm SAP (using a powder spreader, Christy Machine, Freemont, Ohio, at 20% motor rpm) captured in between the layers, to form a single three 33 gsm PLA calendared layers with two layers of SAP captured in between the layers. Two of these insert layers were placed between the outer layers and the four edges of the outside layers were heat sealed together to form the complete food pad.

The tensile strength of the outer film is 6.822 in/lbs and is perforated during calendaring with an engraved roll (Sunday roll); the aperture size is "diamond shaped" and is approximately 0.022 inches in diameter. Metolat 700 (Munzing, Bloomfield, N.J.) was applied to each outside surface of the outer film, before edge sealing, as a surfactant to impact hydrophilicity to the PLA.

The outer film layers were edge sealed on one side using a ¼" band, impulse foot sealer (American International Electric, Whittier, Calif.) at the "4" dial setting. Two insert layers were placed at the edge of the seal and then the remaining three sides were sealed. In this application the insert layers were cut to 2.5" by 2.5" and the film was cut at 3.5" by 3.5".

A simple water absorption test was carried out. The dry weight of the pad was 2.5 grams and was then submerged in water for 60 sec. After a drip time of two minutes the pad weighed 39 g. The pad was then submerged again for sixty minutes, allowed a three minute drip time and re-weighed. The end result was 57 g fully saturated with the pad reaching its full absorption capability, defined as the point of absorption where there is a visual rupture in the edge seal of the food pad. Up to the point of full absorption, the food pad thickness went from 0.068 inches (dry) to 0.65 inches (wet).

What is claimed is:

1. An absorbent, biodegradable food pad, comprising: a core comprising non-woven fibers, said fibers comprising one or more biodegradable thermoplastic polymers and one or more silver-based or silver ion-based antimicrobial agents, wherein the fibers are oriented to provide compression resistance and maintain paths for liquid-flow and air-flow, said fibers oriented substantially in a direction transverse to an exterior surface.

2. The food pad of claim 1, wherein said food pad further comprises one or more superabsorbent polymers.

3. The food pad of claim 1, wherein said antimicrobial agents are selected from a group consisting of silver halides, nitrates, nitrites, selenites, selenides, sulphites, sulphates, sulphadiazine, silver polysaccharides, silver zirconium complexes, or mixtures thereof.

4. The food pad of claim 1, wherein said silver ion-based antimicrobial agents comprise an agent selected from a group consisting of Ag-ion, zeolite-Ag, glass-Ag and nano-silver.

5. The food pad of claim 1, wherein said non-woven fibers comprise one or more of polylactic acid, polylactide, polyglycolide, poly-L-lactide, poly-DL-lactide.

6. The food pad of claim 5, wherein said biodegradable thermoplastic polymers comprise polylactic acid (PLA).

7. The food pad of claim 1, wherein said food pad further comprises a surface film.

8. The food pad of claim 7, wherein the surface film is created by calendaring non-woven material.

9. The food pad of claim 8, wherein said surface film comprises apertures.

10. The food pad of claim 8, wherein said surface film does not comprise apertures.

11. The food pad of claim 7, wherein said surface film is a biodegradable thermoplastic polymer hydrophilic film comprising one or more of cellulose, alginate, gums, starch, chitosan, ethylene glycol, poly-oxethylene, and polylactic acid.

12. The food pad of claim 7, wherein said surface film is a biodegradable thermoplastic polymer hydrophobic film is comprised from one or more of polylactic acid, polylactide, polyglycolide, poly-L-lactide, poly-DL-lactide or copolymers thereof.

13. The food pad of claim 7, wherein the surface film layer and the core are calendared together.

14. The food pad of claim 7, wherein the surface film comprises a top film and a bottom film and the top and bottom film are sealed along the edges.

15. The food pad of claim 1, wherein said fibers are vertically lapped or spirally wound.

16. The food pad of claim 1, wherein said food pad additionally comprises one or more antimicrobial and one or more antifungal agents.

17. The food pad of claim 1, wherein said one or more antimicrobial agents are released upon contact of moisture with the thermoplastic polymer fibers.

18. The food pad of claim 7, wherein the surface film and core are layered in multiplicities.

19. The food pad of claim 18, wherein the food pad further comprises one or more superabsorbent polymers.

20. The food pad of claim 19, wherein the superabsorbent polymer is adhered to the one or more of the layers by one or more of calendaring or by adhesive.

21. The food pad of claim 1, wherein said food pad core can expand up to about 25 times the original thickness dimension when liquid is absorbed by the food pad.

22. The food pad of claim 14, wherein said food pad core can expand up to about 25 times the original thickness dimension when liquid is absorbed by the food pad and said sealed edges do not rupture.

23. The food pad of claim 1, wherein said food pad can increase in weight up to about 100 times the original weight when liquid is absorbed.

24. The food pad of claim 14, wherein said food pad can increase in weight up to about 100 times the original weight when liquid is absorbed by the food pad and said sealed edges do not rupture.

25. The food pad of claim 1, where said food pad is colored to substantially match the color of the food product.

* * * * *